(12) United States Patent
Beck et al.

(10) Patent No.: US 11,994,195 B2
(45) Date of Patent: May 28, 2024

(54) TRANSMISSION, POWERTRAIN, AND VEHICLE

(71) Applicant: ZF Friedrichshafen AG, Friedrichshafen (DE)

(72) Inventors: Stefan Beck, Eriskirch (DE); Matthias Reisch, Ravensburg (DE); Eckhardt Lübke, Friedrichshafen (DE); Timo Wehlen, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 119 days.

(21) Appl. No.: 17/606,239

(22) PCT Filed: Mar. 4, 2020

(86) PCT No.: PCT/EP2020/055641
§ 371 (c)(1),
(2) Date: Oct. 25, 2021

(87) PCT Pub. No.: WO2020/216509
PCT Pub. Date: Oct. 29, 2020

(65) Prior Publication Data
US 2022/0205520 A1 Jun. 30, 2022

(30) Foreign Application Priority Data
Apr. 23, 2019 (DE) .......................... 102019205747.0

(51) Int. Cl.
*F16H 3/64* (2006.01)
*F16H 37/08* (2006.01)

(52) U.S. Cl.
CPC ... *F16H 37/082* (2013.01); *F16H 2200/0034* (2013.01); *F16H 2200/201* (2013.01);
(Continued)

(58) Field of Classification Search
CPC .................. F16H 2200/201–2200/2028; F16H 2200/2064; F16H 2200/2097;
(Continued)

(56) References Cited

U.S. PATENT DOCUMENTS

| 5,087,232 A | * | 2/1992 | Asada | ........................ F16H 3/66 |
|---|---|---|---|---|
| | | | | 475/284 |
| 5,845,732 A | | 12/1998 | Taniguchi et al. | |

(Continued)

FOREIGN PATENT DOCUMENTS

| DE | 102011007259 A1 | 10/2012 |
|---|---|---|
| DE | 102011007260 A1 | 10/2012 |

(Continued)

OTHER PUBLICATIONS

International Search Report and Written Opinion for PCT/EP2020/055641 dated Apr. 28, 2020 (13 pages; with English translation).

*Primary Examiner* — Ernesto A Suarez
*Assistant Examiner* — Lillian T Nguyen
(74) *Attorney, Agent, or Firm* — Kristin L. Murphy

(57) ABSTRACT

A transmission has an input shaft, first and second output shafts, and first and second planetary gear-set, connected together. The first output shaft is rotationally fixed to a first planetary gear-set second element, the second output shaft is rotationally fixed to a second planetary gear-set third element, a first planetary gear-set third element is rotationally fixed to a second planetary gear-set first element via a shaft, and a second planetary gear-set second element is secured to a rotationally fixed component. A first shift element blocks the third planetary gear-set by connecting third planetary gear-set elements in a rotationally fixed manner, a second shift element secures a third planetary gear-set first element to the rotationally fixed component, a third planetary gear-set second element is rotationally fixed to the first planetary gear-set first element via an intermediate shaft, and a third
(Continued)

planetary gear-set third element is rotationally fixed to the input shaft.

22 Claims, 31 Drawing Sheets

(52) U.S. Cl.
CPC ................ *F16H 2200/2035* (2013.01); *F16H 2200/2094* (2013.01)

(58) Field of Classification Search
CPC .... F16H 2200/0034; F16H 3/52–3/666; F16H 48/10–11; F16H 3/62–66; B60K 17/00–17/36
See application file for complete search history.

(56) References Cited

U.S. PATENT DOCUMENTS

| | | | | |
|---|---|---|---|---|
| 7,294,079 | B2* | 11/2007 | Raghavan | F16H 3/728 |
| | | | | 475/5 |
| 11,124,064 | B2* | 9/2021 | Kaltenbach | B60K 1/00 |
| 2007/0129203 | A1* | 6/2007 | Raghavan | F16H 3/728 |
| | | | | 475/275 |
| 2007/0219036 | A1* | 9/2007 | Bucknor | B60K 6/445 |
| | | | | 475/5 |
| 2007/0298924 | A1* | 12/2007 | Bucknor | F16H 3/728 |
| | | | | 475/5 |
| 2011/0027105 | A1* | 2/2011 | Haupt | F16H 61/0025 |
| | | | | 417/326 |
| 2011/0124460 | A1 | 5/2011 | Karlsson et al. | |
| 2015/0087467 | A1* | 3/2015 | Singh | F16H 3/666 |
| | | | | 475/275 |
| 2015/0167788 | A1* | 6/2015 | Beck | F16H 3/66 |
| | | | | 475/269 |
| 2018/0073611 | A1* | 3/2018 | Beck | B60K 6/387 |
| 2019/0078664 | A1* | 3/2019 | Beck | B60K 6/48 |
| 2019/0195328 | A1* | 6/2019 | Koyama | B60K 17/16 |
| 2020/0262293 | A1* | 8/2020 | Glückler | B60K 17/06 |
| 2022/0356936 | A1* | 11/2022 | Beck | B60K 17/165 |

FOREIGN PATENT DOCUMENTS

| | | | |
|---|---|---|---|
| DE | 102011079975 A1 | 1/2013 | |
| DE | 102013210312 A1 | 12/2014 | |
| DE | 102014215156 A1 * | 2/2016 | ............... F16H 3/66 |
| DE | 102016216804 A1 | 3/2018 | |
| DE | 102016220063 A1 | 4/2018 | |
| DE | 102018112880 A1 | 12/2018 | |
| WO | WO-2015169837 A1 * | 11/2015 | ............... B60K 1/00 |

* cited by examiner

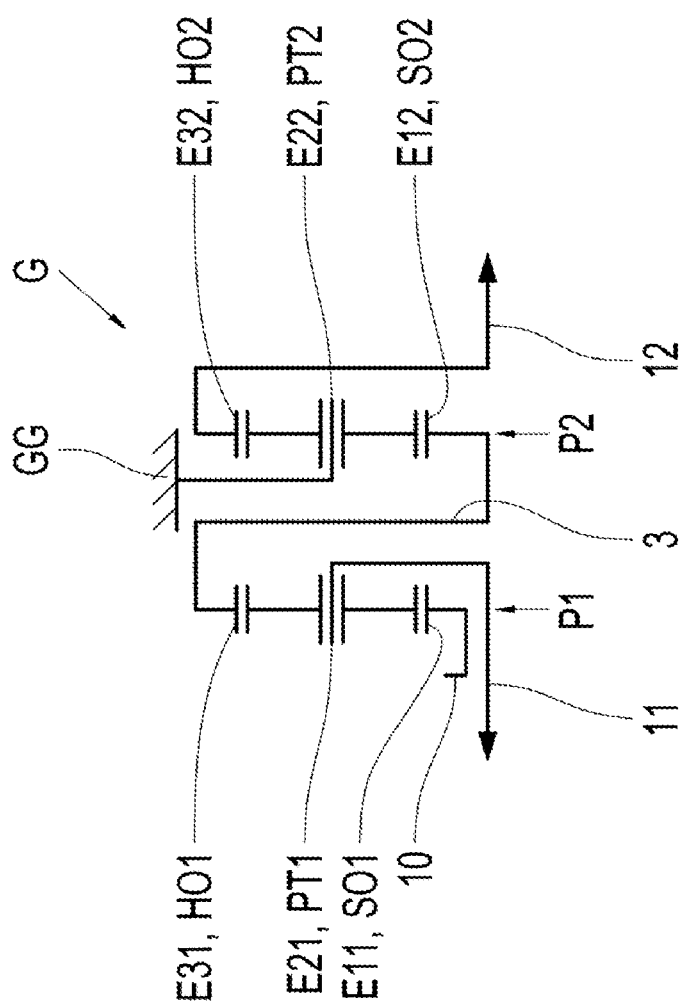

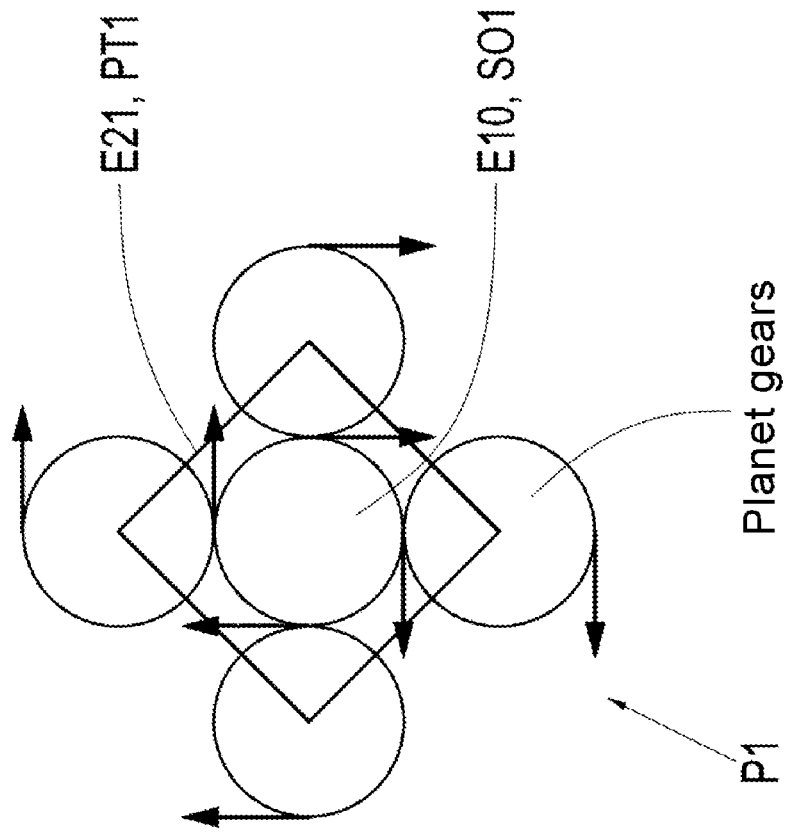
Fig. 13
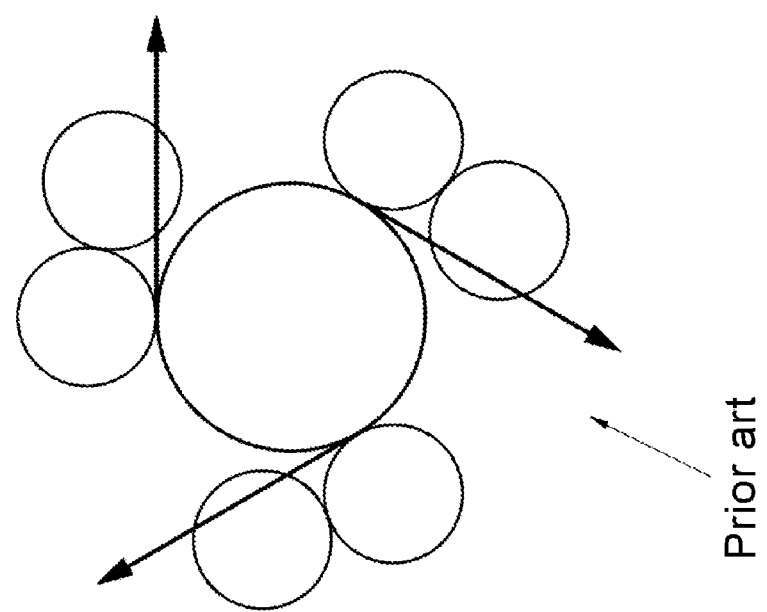
Prior art

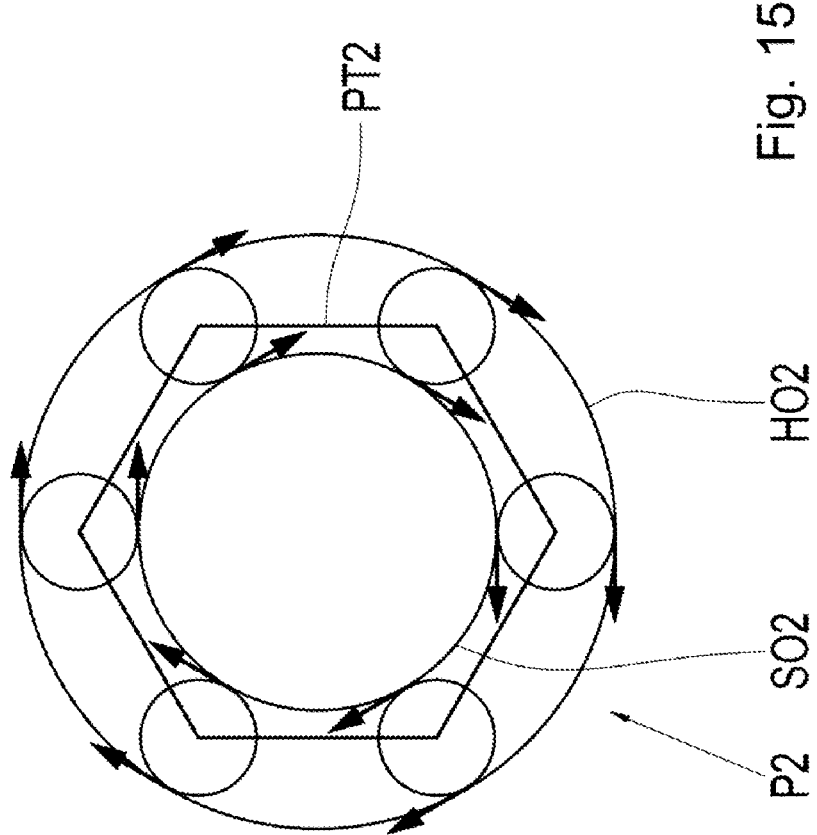
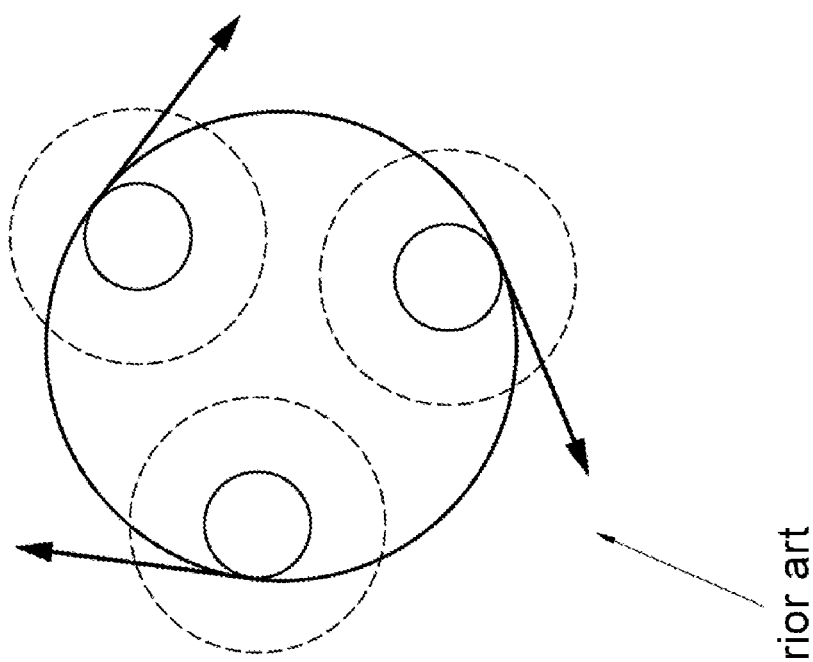
Fig. 15
Prior art

| Figure | P1 | P2 | Calculating rule |
|---|---|---|---|
| 2, 3 | minus | minus | $i_{02} = \dfrac{1}{i_{01}} - 1$ |
| 8 | minus | minus | $i_{02} = \dfrac{1}{i_{01}} - 1$ |
| 9 | minus | minus | $i_{02} = i_{01} - 1$ |
| 4 | plus | minus | $i_{02} = \dfrac{1}{1 - i_{01}} - 1$ |
| 6 | minus | plus | $i_{02} = 2 - \dfrac{1}{i_{01}}$ |
| 5 | plus | plus | $i_{02} = 2 + \dfrac{1}{i_{01} - 1}$ |

Fig. 17

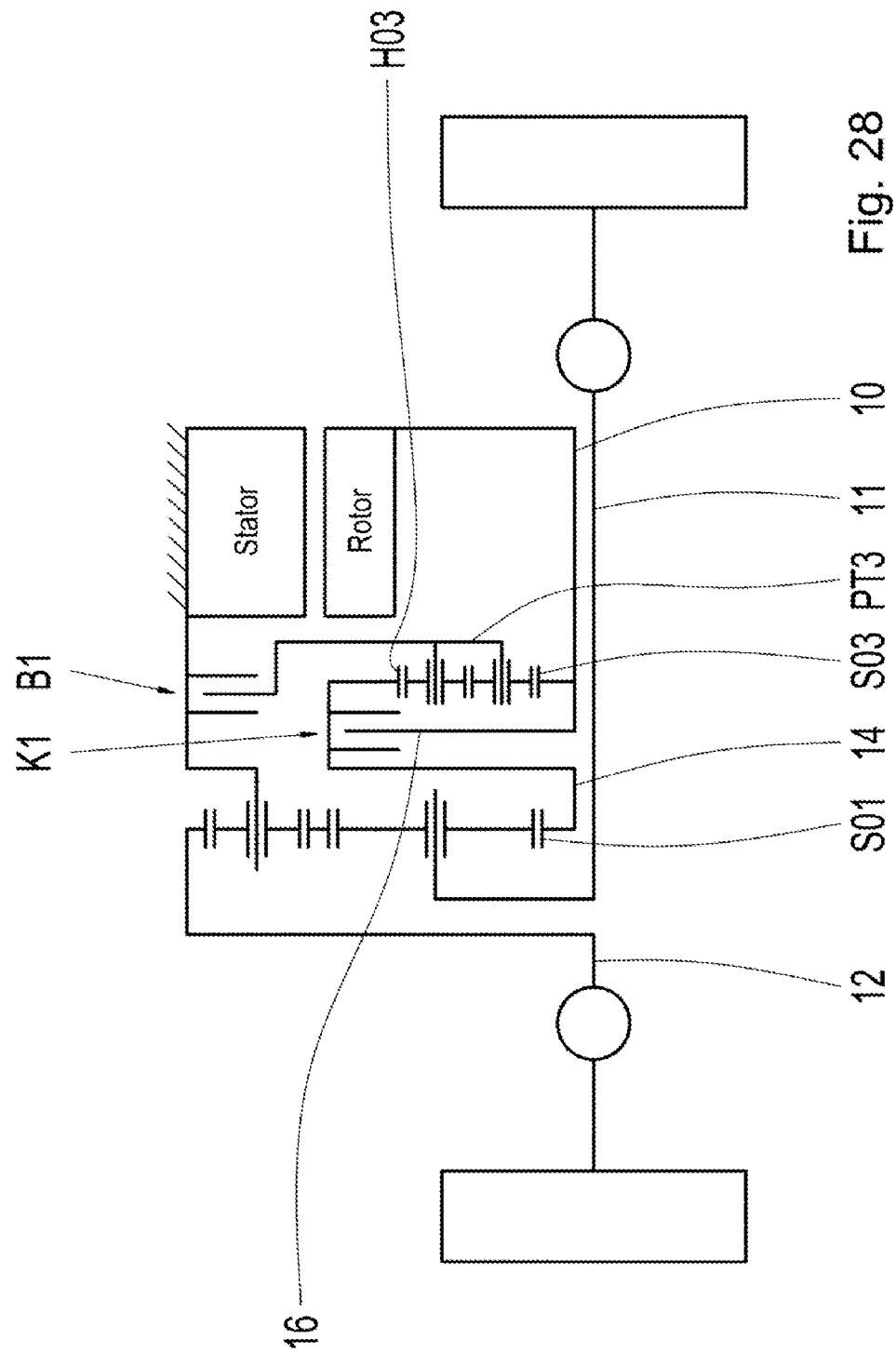

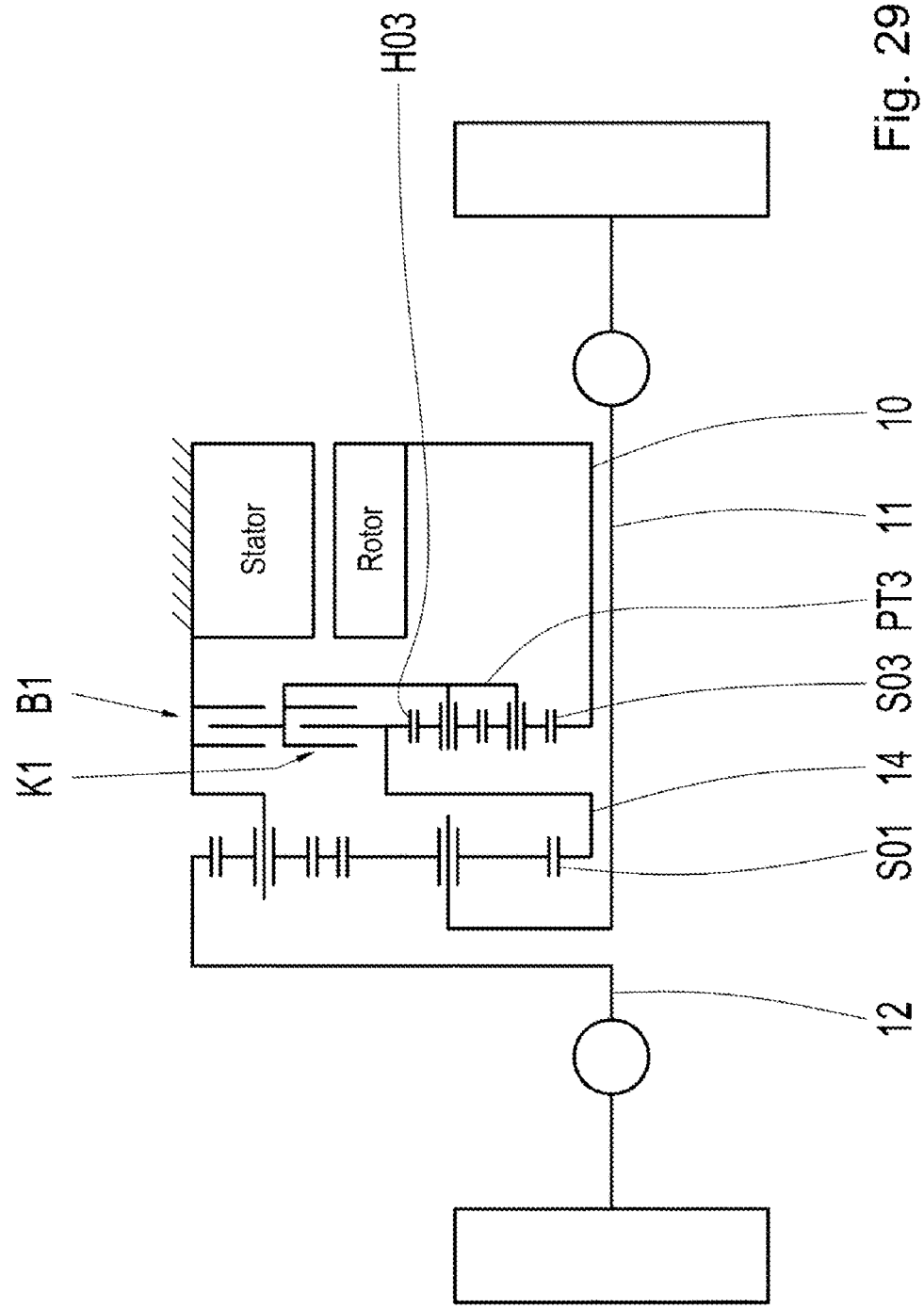

TRANSMISSION, POWERTRAIN, AND VEHICLE

CROSS-REFERENCE TO RELATED APPLICATIONS

This application is a national stage of International Application No. PCT/EP2020/055641, filed Mar. 4, 2020, the disclosure of which is incorporated herein by reference in its entirety, and which claimed priority to German Patent Application No. 102019205747.0, filed Apr. 23, 2019, the disclosure of which is incorporated herein by reference in its entirety.

TECHNICAL FIELD

The disclosure relates to a transmission comprising an input shaft, a first output shaft, a second output shaft, a first planetary gear set and a secondary planetary gear set connected to the first planetary gear set, wherein the planetary gear sets each comprise a plurality of elements, wherein a 2-speed transmission is connected upstream of the transmission. The disclosure additionally relates to a powertrain and to a vehicle having such a transmission.

BACKGROUND

Such transmissions are known from the prior art, for example from DE 10 2011 079 975 A1. Such a transmission allows a torque conversion as a ratio of an output torque to an input torque, and a transmission ratio as a ratio of an input rotational speed to an output rotational speed. In addition, it is known to connect a 2-speed transmission upstream of an aforementioned transmission.

DE 10 2018 112 880 A1 discloses an integrated differential.

What is needed is an arrangement directed to improving the known integrated differential, in particular connecting a 2-speed transmission upstream of the known integrated differential in order thereby to allow a more compact and more cost-effective drive machine and to improve the efficiency of a powertrain.

SUMMARY

The disclosure is directed to an improved transmission, as well as to a powertrain and a vehicle.

Taking the known transmission as a starting point, the transmission is distinguished first of all by the fact that the input shaft, the two output shafts, the planetary gear sets and their elements are arranged and designed in such a way that a torque introduced via the input shaft is converted and is split in a defined ratio between the two output shafts, and the occurrence of a sum torque is prevented. At least one element of the first planetary gear set is connected to another element of the second planetary gear set, and a further element of the second planetary gear set is fixed on a rotationally fixed component.

What is to be understood by a "shaft" in the context of the disclosure is a rotatable component of the transmission via which in each case associated components of the transmission are connected to one another in a rotationally fixed manner or via which such a connection is produced upon actuation of a corresponding shift element. Here, the respective shaft can connect the components to one another axially or radially or else both axially and radially. Thus, the respective shaft can also be present as an intermediate piece via which a respective component is, for example, radially connected.

In one exemplary arrangement, the elements are present in the form of a sun gear, planet carrier and ring gear.

What is to be understood by "axial" within the context of the disclosure is an orientation in the direction of the longitudinal center axis along which the planetary gear sets are arranged so as to be situated coaxially to one another. What is to be understood by "radial" is then an orientation in the diameter direction of a shaft which lies on this longitudinal center axis.

If an element is fixed, it is prevented from a rotational movement. The rotationally fixed component of the transmission can be a permanently stationary component, a housing of the transmission, a part of such a housing or a component connected thereto in a rotationally fixed manner.

As a departure from the prior art, no sum torque, for example on a differential cage, is formed. The prevention of the occurrence of a sum torque means that there is no rotating component (input shaft, output shafts, elements of the planetary gear sets) on which there is presently the sum of the individual torques present on the two output shafts, as is the case with differentials known from the prior art.

The transmission can be configured for example in such a way that:
the input shaft is connected to a first element of the first planetary gear set in a rotationally fixed manner;
the first output shaft is connected to a second element of the first planetary gear set in a rotationally fixed manner;
wherein a third element of the first planetary gear set is connected to a first element of the second planetary gear set in a rotationally fixed manner;
wherein a second element of the second planetary gear set is fixed on a rotationally fixed component of the transmission;
the second output shaft is connected to a third element of the second planetary gear set in a rotationally fixed manner.

The details of the torque conversion can be understood as follows:
The transmission has two output shafts of which the torque sum with respect to the input torque describes the conversion of the transmission. The transmission ratio of the respective output shaft is initially not defined. Only the coupling of the two output shafts, for example via wheels of the vehicle on a roadway, generates defined rotational speeds. If both output shafts rotate at the same rotational speed, such as for example during straight-ahead travel, the transmission ratio can, as in the prior art, be formed as a rotational speed ratio between the input rotational speed and one of the two identical output rotational speeds. In all other cases, it is not possible, with the current definition of the transmission ratio, to designate a transmission ratio of the transmission.

In one exemplary arrangement, the transmission is further distinguished by a third planetary gear set comprising three elements and two shift elements to form the 2-speed stage. A first shift element is designed to block the third planetary gear set by a rotationally fixed connection of two of its elements. A second shift element is designed to fix one of the three elements, and in one particular arrangement, a first element of the third planetary gear set, on the rotationally fixed component. A second element of the third planetary gear set is connected to the first element of the first planetary gear set in a rotationally fixed manner via an intermediate shaft. A third element of the third planetary gear set is connected to the first input shaft in a rotationally fixed manner.

This transmission permits the realization, on the one hand, the torque conversion with the aid of a housing support and, on the other hand, the torque distribution to the output shafts.

This step-up transmission or multi-speed transmission is a constituent part of the transmission and serves to configure an additional step-up in that the rotational speed of the drive machine is stepped up and the input shaft is driven with this stepped-up rotational speed. The multi-speed transmission or step-up transmission is present in the form of a planetary gear mechanism.

There is thus provided a transmission, in particular a differential, which can perform the two functions of torque conversion and torque distribution, which has been achieved up until now by two separate assemblies, by means of a single integral assembly, and additionally has a step-up of the input shaft that can be switched on and off. In other words, the disclosure concerns a combined step-up and differential transmission which is additionally provided with an upstream 2-speed transmission. The provision of a 2-speed transmission according to the disclosure allows better utilization of, for example, an electric machine characteristic map and thereby increases the efficiency of the drive.

In one exemplary arrangement, the first and second planetary gear sets can be arranged axially adjacent to one another. However, the first planetary gear set can also be arranged radially inside the second planetary gear set. In the case of the latter exemplary arrangement, one also speaks of a nested arrangement of the planetary gear sets.

In one exemplary arrangement, toothings of the two interconnected elements of the first and second planetary gear set, that is to say the third element of the first planetary gear set and the first element of the second planetary gear set, are formed on the same component.

In one exemplary arrangement, a pitch of the toothing on the third element of the first planetary gear set and on the first element of the second planetary gear set is identical. The identical pitch allows an axial force freedom of the connecting component or of the coupling shaft, with the result that a complicated axial bearing arrangement can be dispensed with.

What is to be understood by pitch or lead of a helical toothing is the axial path, measured along an associated axis of rotation, which, with a notional continuation of a tooth beyond the actual width of the toothed wheel, is required to bring about a 360° wrapping of the tooth around the axis. In the case of threads, the term thread pitch is customary in an analogous manner. A helically toothed wheel having a plurality of teeth is thus comparable with a multi-start thread. In the case of spindles, the term lead is also customary for the corresponding variable.

In one exemplary arrangement, for the purpose of introducing a torque into the transmission, the input shaft and hence the third element of the third planetary gear set is connected to a drive machine, in particular an electric machine or an internal combustion engine. In the case of the electric machine, in one exemplary arrangement, the rotor of the electric machine is connected to the input shaft in a rotationally fixed manner. In one exemplary arrangement, the rotor is connected to the input shaft via at least one transmission stage.

The electric machine can be arranged so as to lie either coaxially to the planetary gear sets or axially parallel thereto. In the first-mentioned case, the rotor of the electric machine can here either be connected directly to the third planetary gear set in a rotationally fixed manner or else be coupled thereto via one or more intermediate transmission stages, wherein the latter allows a more favorable design of the electric machine with higher rotational speeds and lower torque. Here, the at least one transmission stage can be configured as a spur gear stage and/or as a planet stage, If, by contrast, the electric machine is provided so as to be axially offset to the planetary gear sets, coupling occurs via one or more intermediate transmission stages and/or a traction drive. Here, the one or more transmission stages can also be realized specifically either as a spur gear stage or as a planet stage, A traction drive can be either a belt drive or a chain drive.

In the case of a coaxial arrangement of the electric machine, the first output shaft is guided through the rotor of the electric machine. As a result, the transmission with electric machine is particularly compact.

In one exemplary arrangement, the stationary transmission ratio of the second planetary gear set is at least approximately calculated from the reciprocal of the stationary transmission ratio of the first planetary gear set minus 1, that is to say:

$$i_{02} = \frac{1}{i_{01}} - 1.$$

For the case that the two planetary gear sets are configured as minus planetary gear sets (for example according to FIG. 2 or 3), this calculating rule, with transmission losses being disregarded, produces a respective half-splitting of the output torque between the two output shafts. This is particularly advantageous if the disclosure is used to split the torque between two wheels of the same axle.

If some other torque splitting is desired or if the planetary gear sets are differently configured (for example FIGS. 4 to 9), a calculating rule can be defined in an analogous manner (FIG. 19). Since during operation under actual conditions the asymmetrical transmission losses toward the two output shafts can lead to the fact that a slight deviation from the calculating rule is advantageous in order to obtain identical output torques on both shafts, the expression "at least approximately" is chosen. Furthermore, this wording is used since it is sometimes not possible to exactly maintain the calculating rule while maintaining integer tooth numbers and favorable tooth number combinations, for example in respect of acoustic requirements.

In FIG. 19, the calculating rules of the respective dependency of the stationary ratio of the second planetary gear set on the stationary ratio of the first planetary gear set are designated in an analogous manner for other exemplary gear set combinations. These rules, while disregarding transmission losses, each produce an output torque of the same level and with the same sign on both output shafts.

In one exemplary arrangement, the number of planets of the second planetary gear set is greater than the number of planets of the first planetary gear set. This configuration, despite using the aforementioned calculating rule, makes it possible to realize a large gear ratio, thereby in turn allowing a particularly compact and cost-effective electric machine. In one exemplary arrangement, the second planetary gear set has six planets and the first planetary gear set has four planets. Of course, it is possible, even without applying the computing rule, for the number of the second planetary gear set to be greater than that of the first planetary gear set.

In one exemplary arrangement, the drive machine is installed transversely with respect to a direction of travel. In one exemplary arrangement, the two output shafts are connected to wheels of a vehicle in a rotationally fixed manner.

In one exemplary arrangement, the two output shafts split the introduced torque between different axles of a vehicle. There can thus be realized an arrangement as a longitudinal transfer case (also termed longitudinal splitter), that is to say a transmission which splits the introduced torque, for example, between a plurality of axles, in particular between a front axle and a rear axle of a vehicle.

The torque splitting of the transmission does not have to occur uniformly on the output shafts. In the exemplary arrangement, as a longitudinal transfer case, there can occur a nonuniform splitting between one and the other axle. For example, the splitting of the torque provided by the input shaft can occur in such a way that 60% is channeled to the rear axle and 40% to the front axle.

The first and second planetary gear sets can be configured either as a minus or a plus planetary gear set. A combination of a minus and a plus planetary gear set is also possible.

A minus planetary gear set is composed, in a manner known in principle to a person skilled in the art, of the elements: sun gear, planet carrier and ring gear, wherein the planet carrier guides at least one, but in some exemplary arrangements, a plurality of, planet gears in a rotatably mounted manner, these specifically meshing in each case both with the sun gear and with the surrounding ring gear.

In the case of a plus planetary gear set, the elements: sun gear, ring gear and planet carrier, are also present, wherein the latter guides at least one planet gear pair in which one planet gear meshes with the inner sun gear and the other planet gear meshes with the surrounding ring gear, and the planet gears mesh with one another.

Where a connection of the individual elements allows, a minus planetary gear set can be converted into a plus planetary gear set, in which case, by comparison with the exemplary arrangement as a minus planetary gear set, the ring gear and planet carrier connection are to be swapped with one another and the amount of a stationary transmission ratio is to be increased by one. Conversely, a plus planetary gear set could also be replaced by a minus planetary gear set if the connection of the elements of the transmission allows. Here, by comparison with the plus planetary gear set, the ring gear and planet carrier connection would also have to be swapped with one another, and a stationary transmission ratio reduced by one and the sign changed. Within the context of the disclosure, however, in one exemplary arrangement, the two planetary gear sets are each configured as a minus planetary gear set.

In one exemplary arrangement, the first and second planetary gear set are configured as minus planetary gear sets. They have good efficiency and can be arranged axially next to one another and nested radially.

With a combination of a minus and a plus planetary gear set in a nested arrangement, in one exemplary arrangement, the radially inner planetary gear set is a minus planetary gear set and the radially outer planetary gear set is a plus planetary gear set. Here, on the one hand, there remains a nested capability that can be realized in a simple manner. In addition, in this connection, the fixed ring gear also offers the advantage that the (usually) poorer efficiency produced by the plus planetary gear set has an effect only on a single output shaft.

In one exemplary arrangement, the elements of the transmission can be configured as follows:

a) transmission having two minus planetary gear sets, wherein
the firstelement of the firstplanetary gear set is a sun gear,
the second element of the first planetary gear set is a planet carrier, and
the third element of the first planetary gear set is a ring gear, and wherein
the firstelement of he second planetary gear set is a sun gear,
the second element of the second planetary gear set is a planet carrier, and
the third element of the second planetary gear set is a ring gear.
This transmission could, as a first concept, be designated with two minus planetary gear sets.

b) transmission having two minus planetary gear sets, wherein
the first element of the first planetary gear set is a sun gear,
the second element of the first planetary gear set is a ring gear, and
the third element of the first planetary gear set is a planet carrier, and wherein
the first element of the second planetary gear set is a ring gear,
the second element of the second planetary gear set is a planet carrier, and
the third elementhe second planetary gear set is a sun gear,
This transmission could, as a second concept, be designated with two minus planetary gear sets.

c) transmission having two minus planetary gear sets, wherein
the first element of the first planetary gear set is a ring gear,
the second element of the first planetary gear set is a planet carrier, and
the third element of the first planetary gear set is a sun gear, and wherein
the first element of the second planetary gear set is a sun gear,
the second element of the second planetary gear set is a planet carrier, and
the third element of the second planetary gear set is a ring gear.
This transmission could, as a fifth concept, be designated with two minus planetary gear sets.

d) transmission having a plus and a minus planetary gear set, wherein the second planetary gear set is the minus planetary gear set, wherein
the first element of the first planetary gear set is a sun gear,
the second element of the first planetary gear set is a ring gear, and
the third element of the first planetary gear set is a planet carrier, and wherein
the first element of the second planetary gear set is a sun gear,
the second element of the second planetary gear set is a planet carrier, and
the third element of the second planetary gear set is a ring gear.
This transmission is the first concept with a plus planetary gear set.

e) transmission having a plus and a minus planetary gear set, wherein the first planetary gear set is the minus planetary gear set, wherein
the first element of the first planetary gear set is a sun gear,
the second element of the first planetary gear set is a planet carrier, and the third element of the first planetary gear set is ring gear, and wherein the first element of the second planetary gear set is a sun gear, the second element of the second planetary gear set (P2) is a ring gear, and the third elementhe second planetary gear set is a planet carrier.

This transmission is as it were the first concept with the a plus planetary gear set.

f) transmission having two plus planetary gear sets, wherein the first element of the first planetary gear set is a sun gear, the second element of the first planetary gear set is a ring gear, and the third element of the first planetary gear set is a planet carrier, and wherein the first element of the second planetary gear set is a sun gear, the second element of the second planetary gear set is a ring gear, and the third element of the second planetary gear set is a planet carrier.

This transmission is as it were the first concept with two plus planetary gear sets.

In one exemplary arrangement, the third planetary gear set can be arranged axially adjacent to one of the two first and second planetary gear sets. However, it can also be arranged axially adjacent to both first and second planetary gear sets.

In one exemplary arrangement, the first shift element can be present as a clutch which, upon actuation, in each case adapts the components of the transmission, which link directly thereto in each case, where appropriate in their rotational movements, and then connects them to one another in a rotationally fixed manner.

In one exemplary arrangement, the second shift element can be present as a brake which, upon actuation, fixes the first element of the third planetary gear set and consequently prevents a rotational movement thereof.

If a planetary gear set is blocked, the transmission ratio is always one independent of the tooth number. In other words, the planetary gear set runs around as a block. The blocking of the third planetary gear set can occur in such a way that the first shift element connects the first element to the second element of the third planetary gear set, connects the first element to the third element of the third planetary gear set, or connects the second element to the third element of he third planetary gear set.

In one exemplary arrangement, the third planetary gear set is a minus planetary gear set, wherein the first element is a sun gear, the second element is a planet carrier and the third element is a ring gear.

As an alternative, in one exemplary arrangement, the planetary gear set is a plus planetary gear set, wherein the first element is a sun gear, the second element is ring gear and the third element is a planet carrier.

In one exemplary arrangement, at least one of the shift elements is configured as a power shift element.

In one exemplary arrangement, at least one of the shift elements is configured as a positively locking element, and in one exemplary arrangement, a claw shift element or synchronizer.

In contrast with nonpositively locking shift elements, positively locking shift elements have the advantage that lower drag losses occur in the open state, with the result that a better efficiency of the transmission can be achieved.

In one exemplary arrangement, one of the two shift elements is configured as a power shift element and the other of the two shift elements is configured as a positively locking element.

In one exemplary arrangement, the quicker speed can be assigned to the power shift element in order to allow a power shift capability in traction mode. By contrast, the slower gear can be assigned to the positively locking element. The positively locking element can be configured in particular to be compact, since power shifts in overrun can frequently be dispensed with.

In one exemplary arrangement, the two shift elements are configured as a double shift element, with the result that one shift element can be spared.

In one exemplary arrangement, the first output shaft is guided through the third planetary gear set. In one exemplary arrangement, the shift elements are arranged radially over one another. The two aforementioned features, on their own in each case or in combination with one another, produce a compact transmission.

In one exemplary arrangement, the intermediate shaft is guided through the third planetary gear set, for example, through the first element of the third planetary gear set. In one exemplary arrangement, the intermediate shaft is at least partially guided radially between the third planetary gear set and the first output shaft. In one exemplary arrangement, a connecting element connecting the first element of the third planetary gear set and the second shift element is at least partially arranged axially between the first planetary gear set and the third planetary gear set. The connecting element can be a shaft.

The three aforementioned features with regard to the intermediate shaft and the connecting element, on their own in each case or in combination with one another, produce a transmission in which the rotor shaft can be mounted with a small diameter. This allows the use of small rolling bearings which allow high electric machine rotational speeds.

In one exemplary arrangement, the amount of the stationary ratio of the third planetary gear set is less than the amount of the stationary ratio of the first planetary gear set. In one exemplary arrangement, the toothing diameter of the first element of the third planetary gear set is greater than the toothing diameter of the first element of the first planetary gear set. The two aforementioned features, on their own in each case or in combination with one another, allow a balanced transmission ratio sequence. As a result, the electric machine can be dimensioned to be compact. In addition, when using one or two power shift elements, the loading of the power shift element or of the power shift elements can be kept relatively low.

The transmission is of a motor vehicle powertrain for a hybrid or electric vehicle and is then arranged between a drive machine, which is configured as an internal combustion engine or as an electric machine, of the motor vehicle and further components of the powertrain that follow in the force flow direction to drive wheels of the motor vehicle. Here, the input shaft of the mechanism is coupled to a crankshaft of the internal combustion engine or to the rotor shaft of the electric machine. The transmission can also be part of a drivetrain for a conventional motor vehicle, that is to say a vehicle which is driven only by an internal combustion engine.

The fact that two components of the transmission are "connected" or "coupled" or "connected to one another" in a rotationally fixed manner means, within the context of the disclosure, a permanent coupling of these components, with the result that they cannot rotate independently of one another. In this respect, no shift element is provided between these components, which can be elements of the planetary gear sets and/or shafts and/or a rotationally fixed component of the transmission: rather, the corresponding components are fixedly coupled to one another. A torsionally elastic connection between two components is also to be understood as rotationally fixed. In particular, a rotationally fixed connection can also contain joints, for example to allow a steering movement or a compression of a wheel.

Overall, the disclosure allows the provision of a transmission and a vehicle having such a transmission which has an integral design, that is to say torque conversion and torque distribution and also a compact and axially short (in particular with a nested arrangement) construction. Moreover, the transmission is distinguished by good efficiency and low costs given its low degree of complexity. Significantly fewer toothing forces occur. In addition, the problem of seizing can be reduced. Furthermore, an extremely low blocking value can be realized.

The disclosure is not limited to the specified combination of the features of the main claim or the claims dependent thereon. There also arise possibilities of combining individual features with one another, insofar as they emerge from the claims, the following description of preferred embodiments of the disclosure or directly from the drawings. The reference of the claims to the drawings through the use of reference signs is not intended to limit the scope of protection of the claims.

BRIEF DESCRIPTION OF DRAWINGS

Advantageous exemplary arrangements of the disclosure, which will be explained below, are illustrated in the drawings, in which:

FIGS. 2-5 show a schematic view of a transmission in each case, as can be used in the motor vehicle powertrain from FIG. 1, in an exemplary arrangement in each case;

FIGS. 13-16 show a schematic illustration of the operating principle of the disclosure;

FIG. 17 shows an overview of the stationary transmission ratios of the individual arrangements; and FIGS. 18 to 29 show exemplary arrangements relating to the 2-speed transmission taking the example of the transmission from FIG. 3.

DETAILED DESCRIPTION

FIGS. 1a to 1e each show a schematic view of a transmission G of a motor vehicle powertrain 100 of a vehicle 1000 in the form of a passenger car.

Figure 1A:
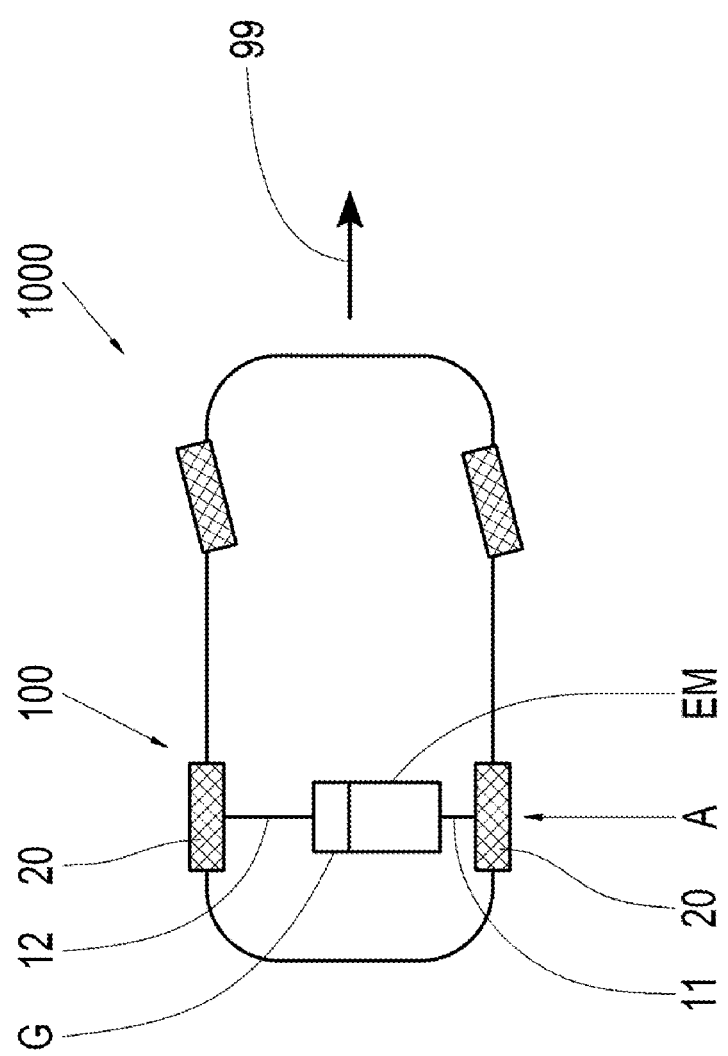
FIGS. 1a-e each show a schematic view of a motor vehicle powertrain.

The powertrain 100 according to FIG. 1a shows an electric drive which drives the rear axle A of the vehicle 1000. The powertrain comprises a transmission G which splits the drive torque of the electric machine EM between two output shafts 11 and 12. The transmission G and the electric machine are arranged in a common housing. The forward direction of travel is illustrated by the arrow 99. As can also be seen in FIG. 1a, the transmission G and the electric machine EM are oriented transversely with respect to the direction of travel of the vehicle.

Figure 1B:
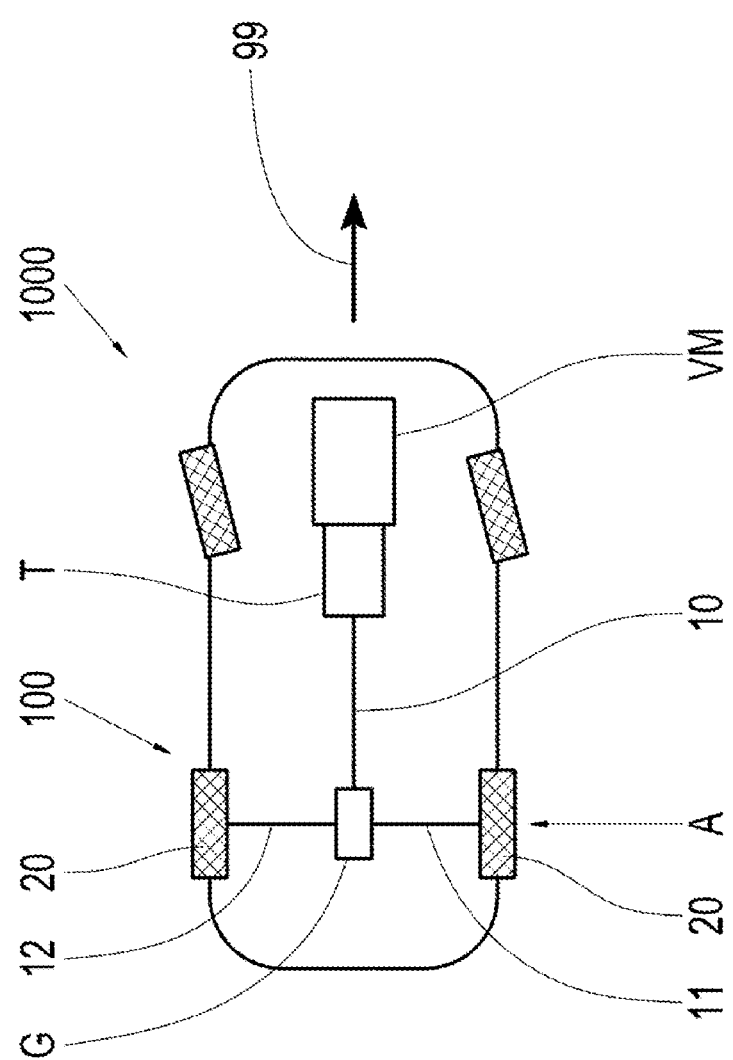

The powertrain 100 according to FIG. 1b shows an internal combustion engine drive which drives the rear axle A of the vehicle 1000. The powertrain comprises a transmission G which splits the drive torque of the internal combustion engine VM between two output shafts 11 and 12, wherein a further transmission, for example an automatic transmission, of the vehicle, is arranged between the transmission G and internal combustion engine VM. The forward direction of travel is illustrated by the arrow 99. As can also be seen in FIG. 1b, the transmission G and the internal combustion engine VM are oriented longitudinally with respect to the direction of travel of the vehicle.

Figure 1C:
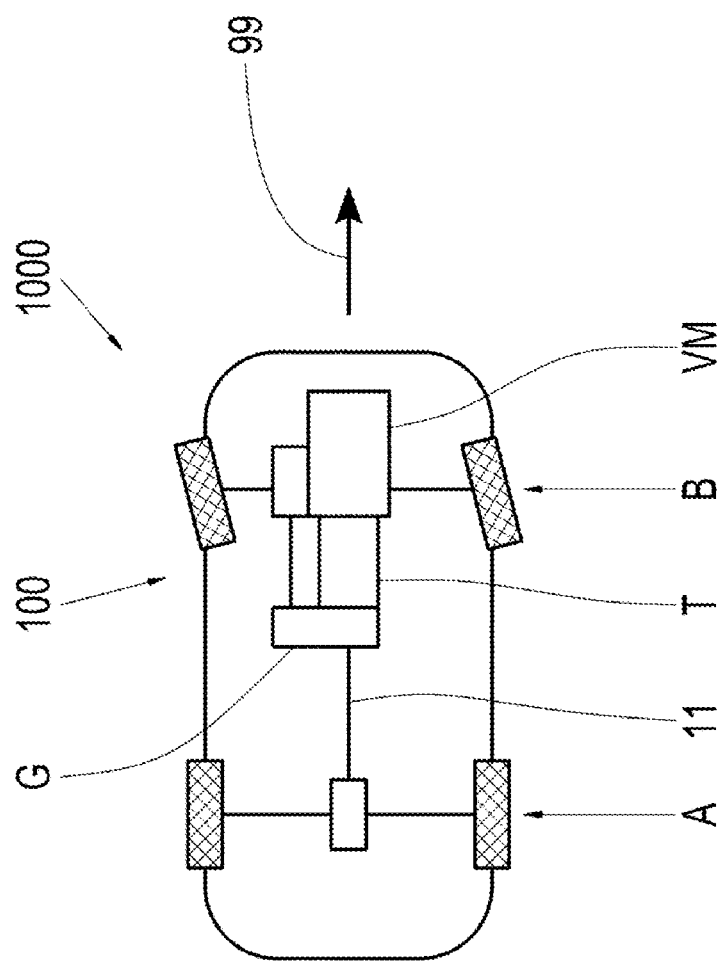

The powertrain 100 according to FIG. 1c shows an internal combustion engine drive which drives the rear axle A and the front axle B of the vehicle 1000. The powertrain comprises a transmission G which splits the drive torque of the internal combustion engine VM between the axles A and B, wherein a further transmission, for example an automatic transmission, of the vehicle is arranged between the transmission G and internal combustion engine VM, The transmission G can then be connected to an axle differential of the rear wheel axle A via an output shaft 11 and to an axle differential of the front axle B via an output shaft 12. The forward direction of travel is illustrated by the arrow 99. As can also be seen in FIG. 1c, the transmission G and internal combustion engine VM are oriented longitudinally with respect to the direction of travel of the vehicle.

Figure 1D:
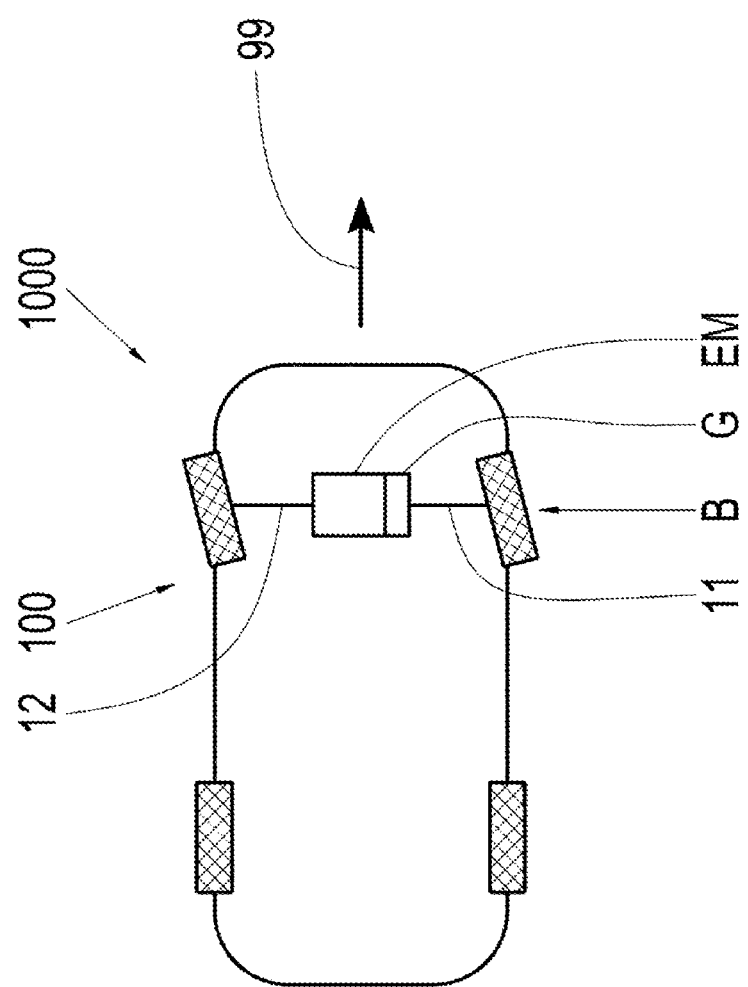

The powertrain 100 according to FIG. 1d shows an electric drive which drives the front axle B of the vehicle 1000, that is to say an electric front transverse drive. The powertrain comprises a transmission G which splits the drive torque of the electric machine EM between two output shafts 11 and 12. The transmission G and the electric machine are arranged in a common housing. The forward direction of travel is illustrated by the arrow 99. As can also be seen in FIG. 1d, the transmission G and the electric machine EM are oriented transversely with respect to the direction of travel of the vehicle.

Figure 1E:
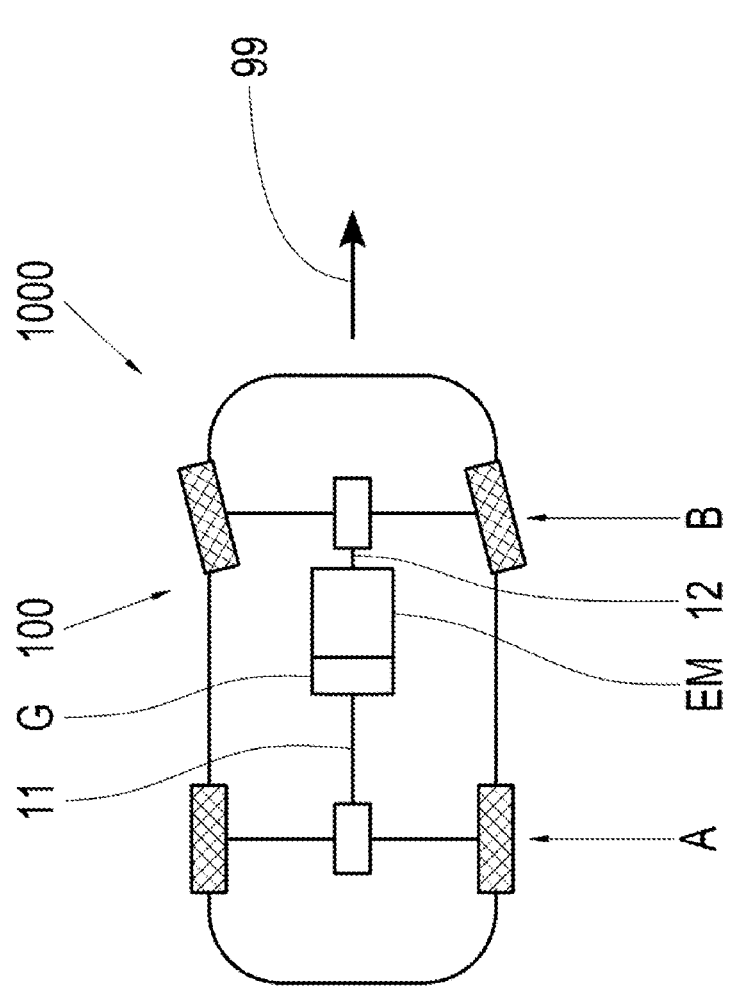

The powertrain 100 according to FIG. 1e shows an electric all-wheel drive which drives the rear axle A and the front axle B of the vehicle 1000. What is concerned here is a transmission configured as a longitudinal splitter. The powertrain comprises a transmission G which splits the drive torque of the electric machine EM between two output shafts 11 and 12. The output shaft 11 transmits the torque to the front axle B, whereas the output shaft 12 transmits the torque to the rear axle A. The respective torques are then in turn introduced into respective axle differentials, The transmission G and the electric machine are arranged in a common housing. The forward direction of travel is illustrated by the arrow 99. As can also be seen in FIG. 1e, the transmission G and the electric machine EM are oriented transversely with respect to the direction of travel of the vehicle.

FIGS. 2 to 9 show transmissions which can be equipped with a third planetary gear set and two shift elements for stepping up the input shaft. Examples with such a transmission follow from FIG. 18.

FIG. 2 shows a transmission G in a first exemplary arrangement. The transmission G comprises an input shaft 10, a first output shaft 11, a second output shaft 12, a first planetary gear set P1 and a second planetary gear set P2 connected to the first planetary gear set P1. In the present, the planetary gear sets P1 and P2 are each designed as a minus planetary gear set. The planetary gear sets P1, P2 each comprise a plurality of elements E11, E21, E31, E12, E22, E32, wherein the first element E11 is a sun gear SO1, the second element E21 is a planet carrier PT1 and the third element E31 of the first planetary gear set P1 is a ring gear HO1. In the second planetary gear set P2, the first element E12 is a sun gear SO2, the second element E22 is a planet gear carrier PT2 and the third element E32 is a ring gear HO2. The planet gear carriers PT1, PT2 each bear a plurality of planet gears, which are illustrated but not designated. The planet gears mesh on the one hand with the respective, radially inner sun gear and also with the respective, surrounding ring gear. The input shaft 10, the first output shaft 11 and the second output shaft 12 are arranged coaxially to one another. The two planetary gear sets P1, P2 are also arranged coaxially to one another.

In the present arrangement, the input shaft 10 is connected to the first element E11 in a rotationally fixed manner. The first output shaft 11 is connected in a rotationally fixed manner to the second element E21 of the first planetary gear set in a rotationally fixed manner. The second output shaft 12 is connected in a rotationally fixed manner to the third element E32 of the second planetary gear set in a rotationally fixed manner. The third element E31 of the first planetary gear set P1 is connected to the first element E12 of the second planetary gear set P2 in a rotationally fixed manner, whereas the second element E22 of the second planetary gear set P2 is fixed on a rotationally fixed component GG. The rotationally fixed component GG is a transmission housing of the transmission G.

The third element E31, that is to say the ring gear HO1 of the first planetary gear set P1, and the first element E12, that is to say the sun gear SO2 of the second planetary gear set, form a common component which, in the present arrangement, is present as a shaft 3.

As can be seen in FIG. 2, the input shaft 10, the first output shaft 11 and the second output shaft 12 are arranged coaxially to one another. The two planetary gear sets P1, P2 are also arranged coaxially to one another. According to this arrangement, the two planetary gear sets P1, P2 are arranged axially spaced apart from one another.

The input shaft 10 can be connected to a drive machine and thus introduce an input torque into the transmission G. That is to say that the input shaft and the output shafts rotate in the same direction. By virtue of the two planetary gear sets P1, P2 being connected to one another and the second element E22 being supported on the housing GG, the introduced input torque can be split between the two output shafts 11, 12. Here, the transmission performs not only the function of a step-up transmission, but additionally also that of a differential transmission. That is to say that the introduced torque is not only stepped up but also split between different output shafts. In this exemplary arrangement, no direction of rotation reversal occurs.

Figure 3:
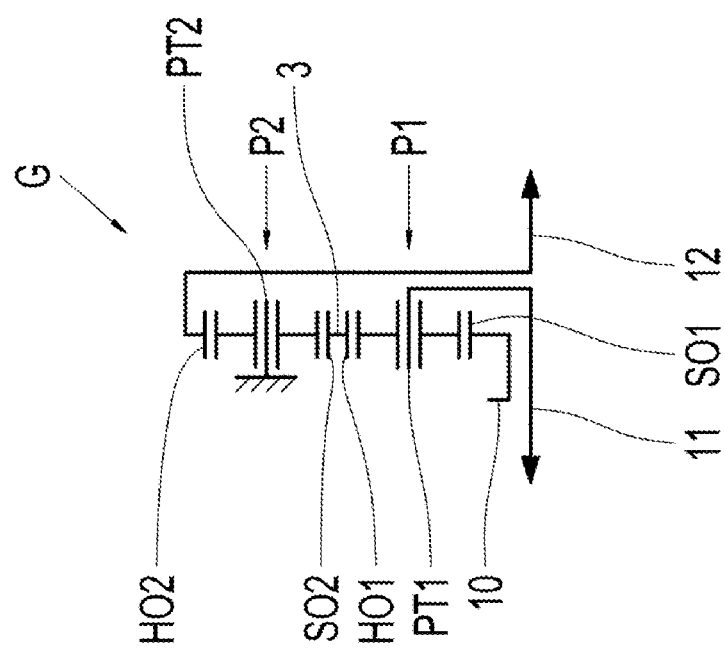

FIG. 3 shows a further exemplary arrangement of the transmission G. In contrast with the arrangement according to FIG. 2, the arrangement according to FIG. 3 shows a radially nested arrangement of the two planetary gear sets P1, P2. Whereas the arrangement according to FIG. 2 proposes an extremely radially compact solution, the arrangement according to FIG. 3 allows extremely axially compact transmission G. Here, the first planetary gear set P1 forms the radially inner planetary gear set. The second planetary gear set P2 forms the radially outer planetary gear set. The first planetary gear set P1 is accordingly situated radially inside the second planetary gear set P2. In this arrangement, too, the connection of the first ring gear HO1 of the first planetary gear set P1 to the sun gear SO2 of the second planetary gear set is formed as a single component which, in the present case, is also present as a shaft 3. in this arrangement, there also occurs no direction of rotation reversal.

Figure 4:
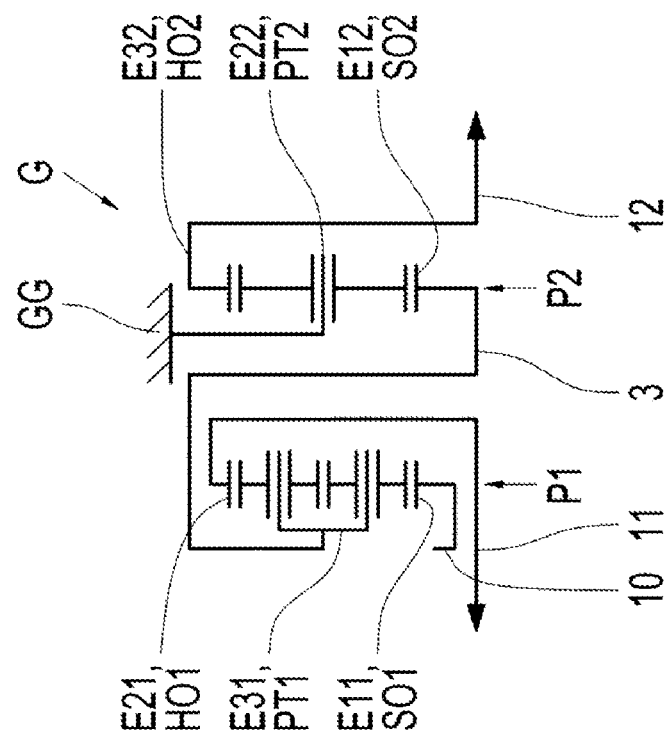

FIG. 4 shows a transmission G in a further exemplary arrangement. In contrast with FIG. 2, the first planetary gear set P1 is now designed as a plus planetary gear set. That is to say that the third element E31 of the first planetary gear set is formed as a planet gear carrier which is connected to the first element El 2 of the second planetary gear set, that is to say the sun gear SO2, in a rotationally fixed manner. The second element E21 is now formed as a ring gear HO1 and connected to the first output shaft 11 in a rotationally fixed manner. The third element E31 of the first planetary gear set and the first element E12 of the second planetary gear set are in turn formed on the same component which, in the present case, is present as a shaft 3. Otherwise, reference is made to the statements pertaining to FIG. 2.

Figure 5:
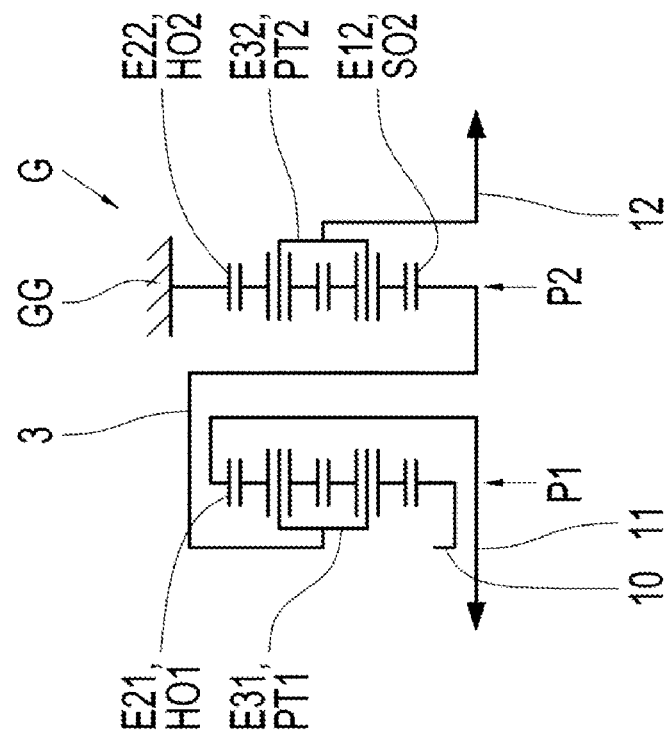

FIG. 5 shows a further exemplary arrangement of the transmission G. In contrast with the arrangement according to FIG. 2, both planetary gear sets P1, P2 are now formed as plus planetary gear sets. Thus, the second element E21 is formed as a ring gear HO1 and connected to the first output shaft 11 in a rotationally fixed manner. The third element E31 is now formed as a planet carrier PT1 and connected to the first element E12, that is to say the sun gear SO2 of the second planetary gear set P2, in a rotationally fixed manner. The second element E22 of the second planetary gear set P2 is now formed as the ring gear HO2 and fixed on the rotationally fixed component GG. By contrast, the third element E32 of the second planetary gear set P2 is formed as a planet carrier PT2 and connected to the second output shaft 12 in a rotationally fixed manner.

In both planetary gear sets P1, P2, the planet carrier and ring gear connection have thus been interchanged. Otherwise, reference is made to the statements pertaining to FIG. 2.

Figure 6:
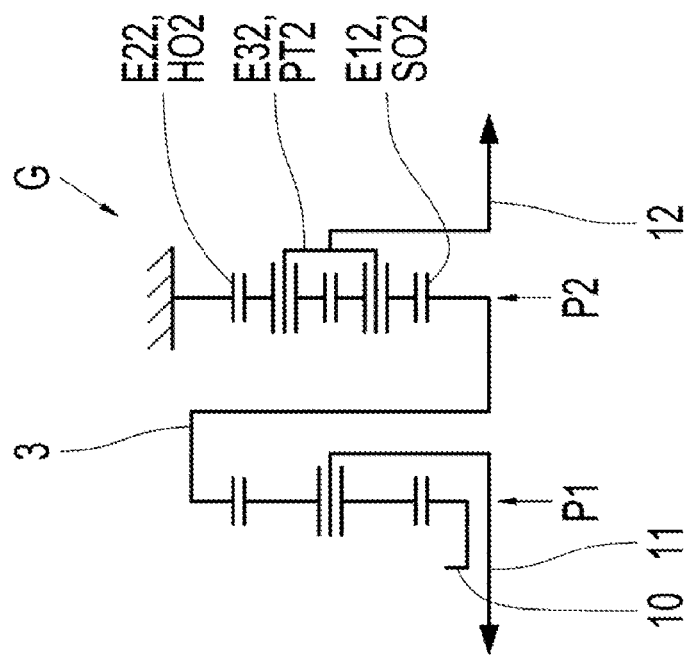
FIG. 6 shows a schematic view of a transmission, as can be used in the motor vehicle powertrain from FIG. 1, in an exemplary arrangement.

FIG. 6 shows a transmission in a further examplary arrangement. In contrast with the arrangement according to FIG. 2, the second planetary gear set P2 is now formed as a plus planetary gear set, whereas, on the other hand, the first planetary gear set P1 remains unchanged. Consequently, the ring gear HO2 of the second planetary gear set P2 is thus fixed on the housing GG. Moreover, the planet carrier PT2 is connected to the second output shaft 12 in a rotationally fixed manner. The planet carrier and ring gear connection of the second planetary gear set have thus been interchanged. Otherwise, reference is made to the statements pertaining to FIG. 2.

Figure 7:
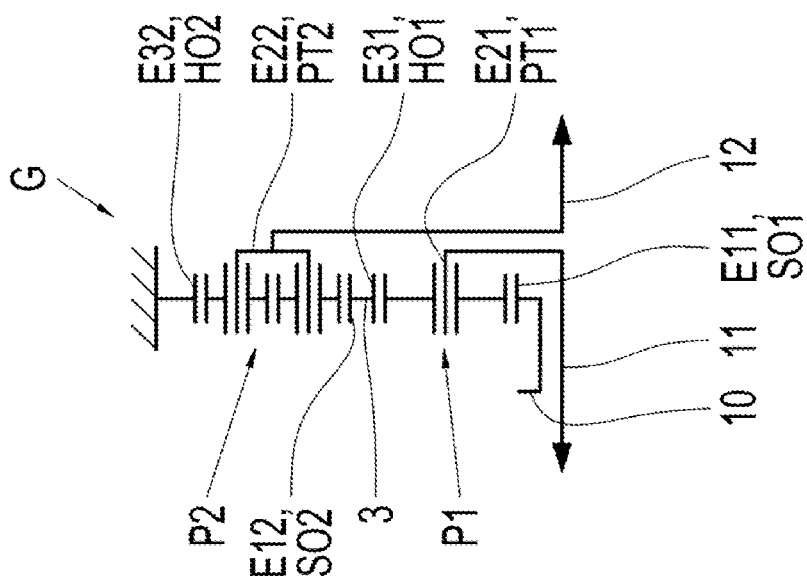
FIGS. 7-9 show a schematic view of a transmission in each case, as can be used in the motor vehicle powertrain from FIG. 1, in an exemplary arrangement in each case.

FIG. 7 shows a further exemplary arrangement of the transmission G. In contrast with the arrangement according to FIG. 6, the arrangement according to FIG. 7 provides radially nested planetary gear sets P1, P2. The radially inner planetary gear set is the first planetary gear set P1. The radially outer planetary gear set is the second planetary gear set P2. Otherwise, reference is made to the statements pertaining to FIG. 6 or 2.

Figure 8:
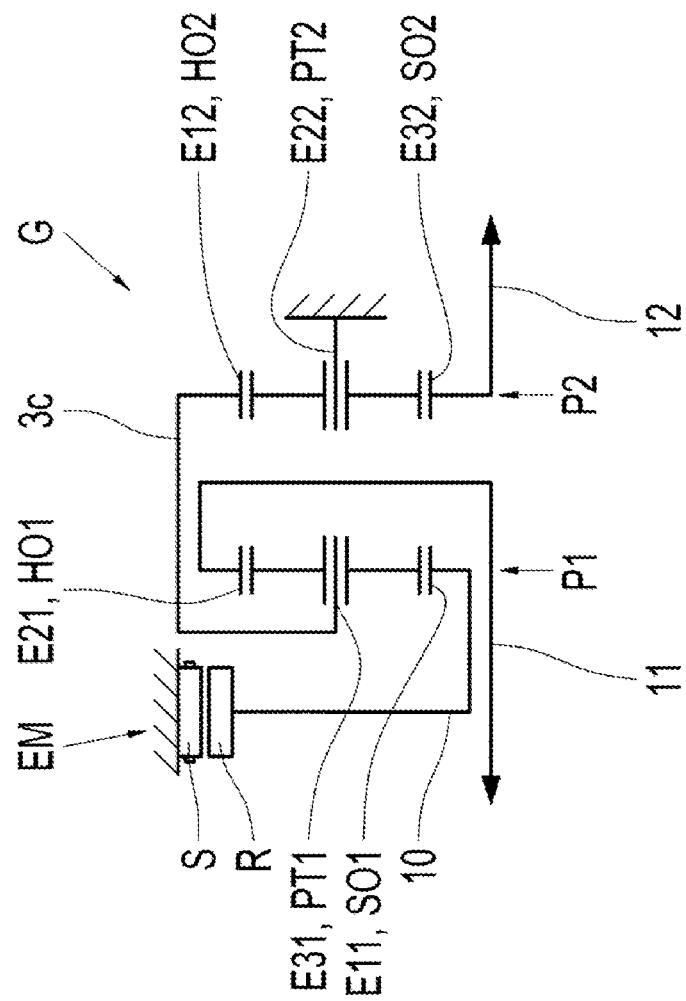

FIG. 8 shows the transmission G in a further exemplary arrangement. In relation to the exemplary arrangement shown in FIG. 2, this arrangement has the following differences. On the one hand, a drive machine in the form of an electric machine EM is provided. The electric machine EM comprises a housing-mounted stator S and a rotor R. The rotor R of the electric machine EM is connected to the first element E11, that is to say the sun gear SO1 of the first planetary gear set, in a rotationally fixed manner. A further difference lies in the fact that the second element E21 of the first planetary gear set is formed as a ring gear HO1 and is connected to the first output shaft 11 in a rotationally fixed manner. Moreover, the third element E31 of the first planetary gear set P1 is formed as a planet carrier PT1 and connected to the first element E12 of the second planetary gear set P2, which in the present case is formed as a ring gear HO2, in a rotationally fixed manner. The second element E22 of the second planetary gear set continues to be formed as a planet carrier PT2 and is fixed on the housing GG. Accordingly, the third element E32 is formed as a sun gear SO2 and connected to the second output shaft in a rotationally fixed manner. In this exemplary arrangement, there occurs a direction of rotation reversal of the input rotational speed. Nesting of the planetary gear sets P1, P2 is not possible in this arrangement.

In other words, the introduction of the torque continues to occur via the sun gear SO1 of the first planetary gear set P1, whereas, on the other hand, the output is ensured via the ring gear HO1. As a departure from FIG. 2, the planet carrier of the first planetary gear set P1 is now connected to the ring gear HO2 of the second planetary gear set in a rotationally fixed manner. In contrast with the exemplary arrangement shown in FIG. 2, the output of the second planetary gear set accordingly occurs via the sun gear SO2.

Figure 9:
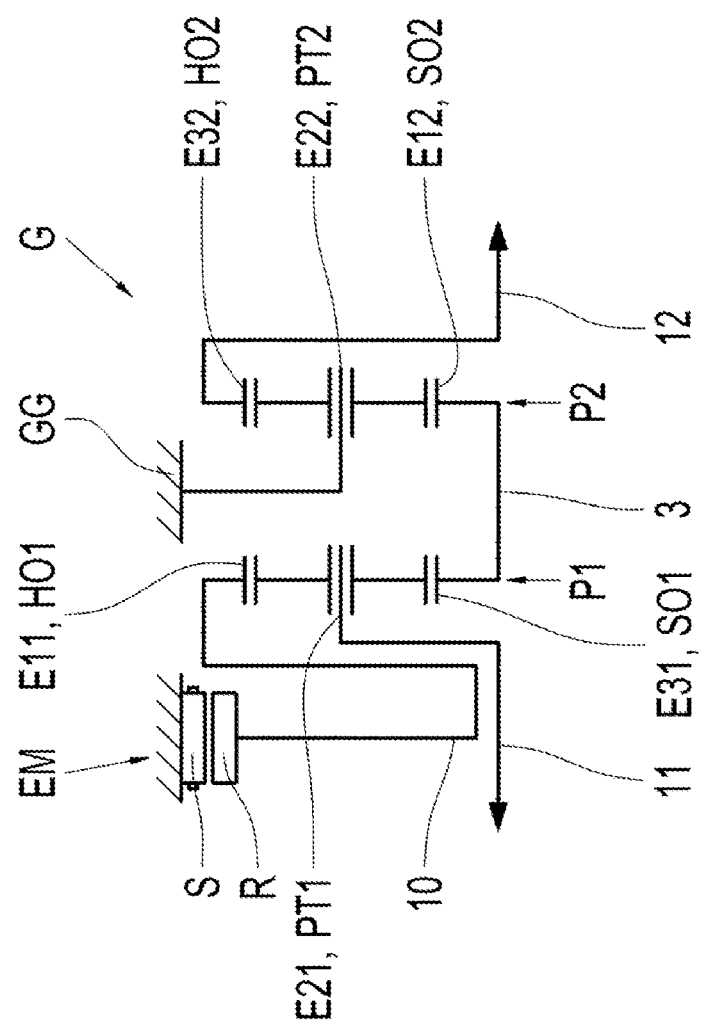

FIG. 9 shows a further exemplary arrangement of the transmission G. The arrangement has the following differences over the exemplary arrangements shown in FIG. 2. On the one hand, a drive machine in the form of an electric machine EM is provided which has a housing-mounted stator S and a rotor R. The rotor R is connected to the input shaft 10 in a rotationally fixed manner, this shaft in turn being connected to the first element E11, which is formed in the present arrangement as a ring gear HO1, of the first planetary gear set P1. In the present arrangement, the first output shaft 11 is connected to the second element E21, which, in the present case, is present as a planet carrier PT2, of the first planetary gear set P1. The third element E31 of the first planetary gear set P1, which in the present case is formed as a sun gear 501, is connected to the first element E12, that is to say the sun gear SO2 of the second planetary gear set P2, in a rotationally fixed manner. The remaining elements of the second planetary gear set remain unchanged.

As a departure from the exemplary arrangement according to FIG. 2, in the arrangement according to FIG. 9 the introduction of the torque occurs via the ring gear HO1 of the first planetary gear set P1, whereas the output of the first planetary gear set P1 continues to occur via the planet carrier PT1. By contrast with FIG. 2, the connection of the two planetary gear sets P1, P2 occurs via a common sun gear, which, in the present arrangement, is present as a shaft 3.

Figure 10:
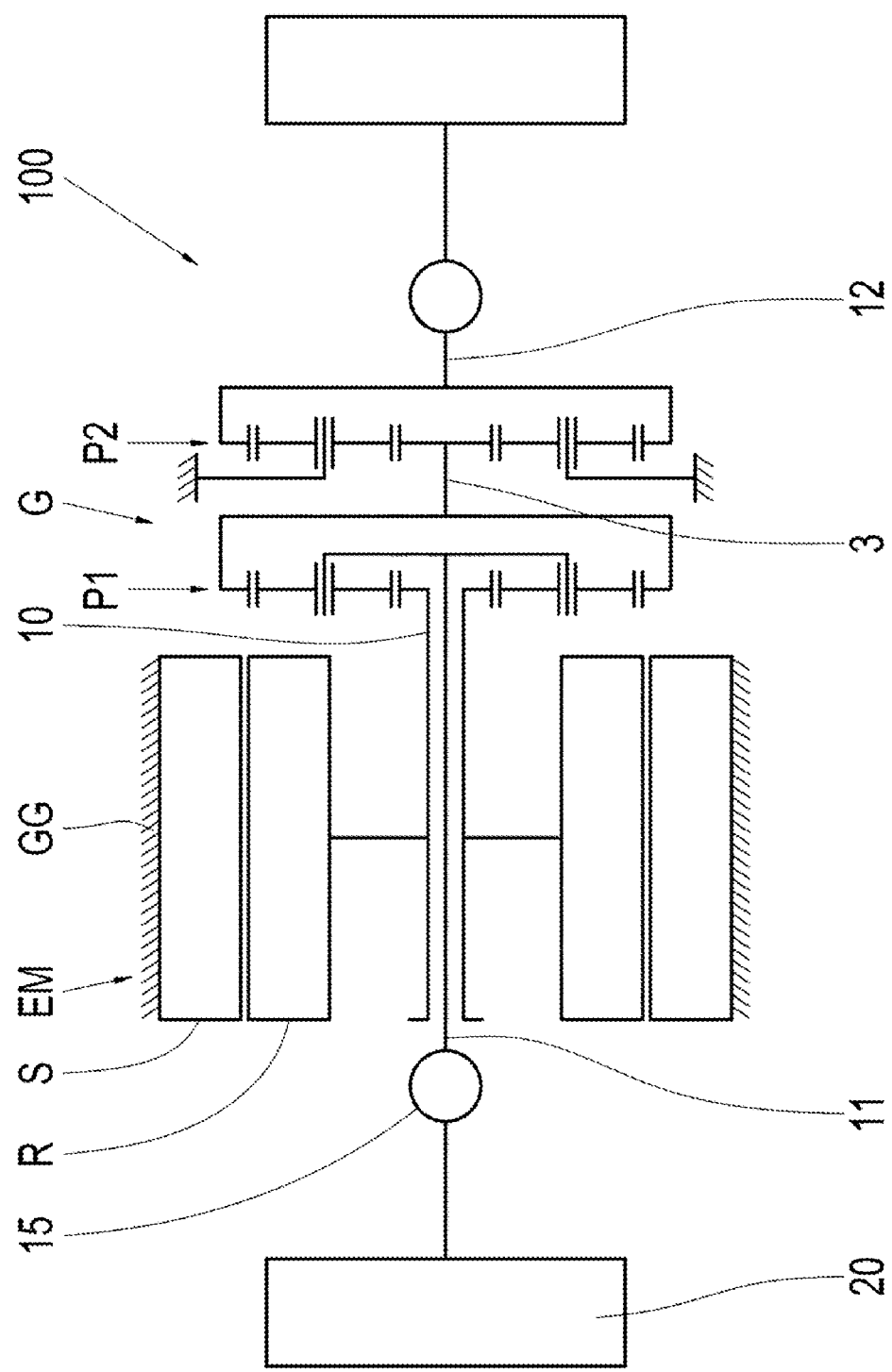
FIGS. 10-11 show a schematic view of a transmission in each case, as can be used in the motor vehicle powertrain from FIG. 1, in an exemplary arrangement in each case.

FIG. 10 shows a powertrain of a vehicle having a transmission according to the disclosure in a further exemplary arrangement. The transmission G is the arrangement according to FIG. 2, to which reference is made. The drive machine is formed as an electric machine EM. The electric machine EM has a housing-mounted stator S and a rotor R. The rotor R is connected to the input shaft 10 in a rotationally fixed manner. As can clearly be seen, the electric machine EM is arranged coaxially to the input shaft 10 and to the output shafts 11, 12. Moreover, it is thus arranged coaxially to the planetary gear sets P1, P2. The input shaft 10 is configured as a hollow shaft through which the first output shaft 11 is guided. Otherwise, reference is made to the statements pertaining to FIG. 10.

Figure 11:
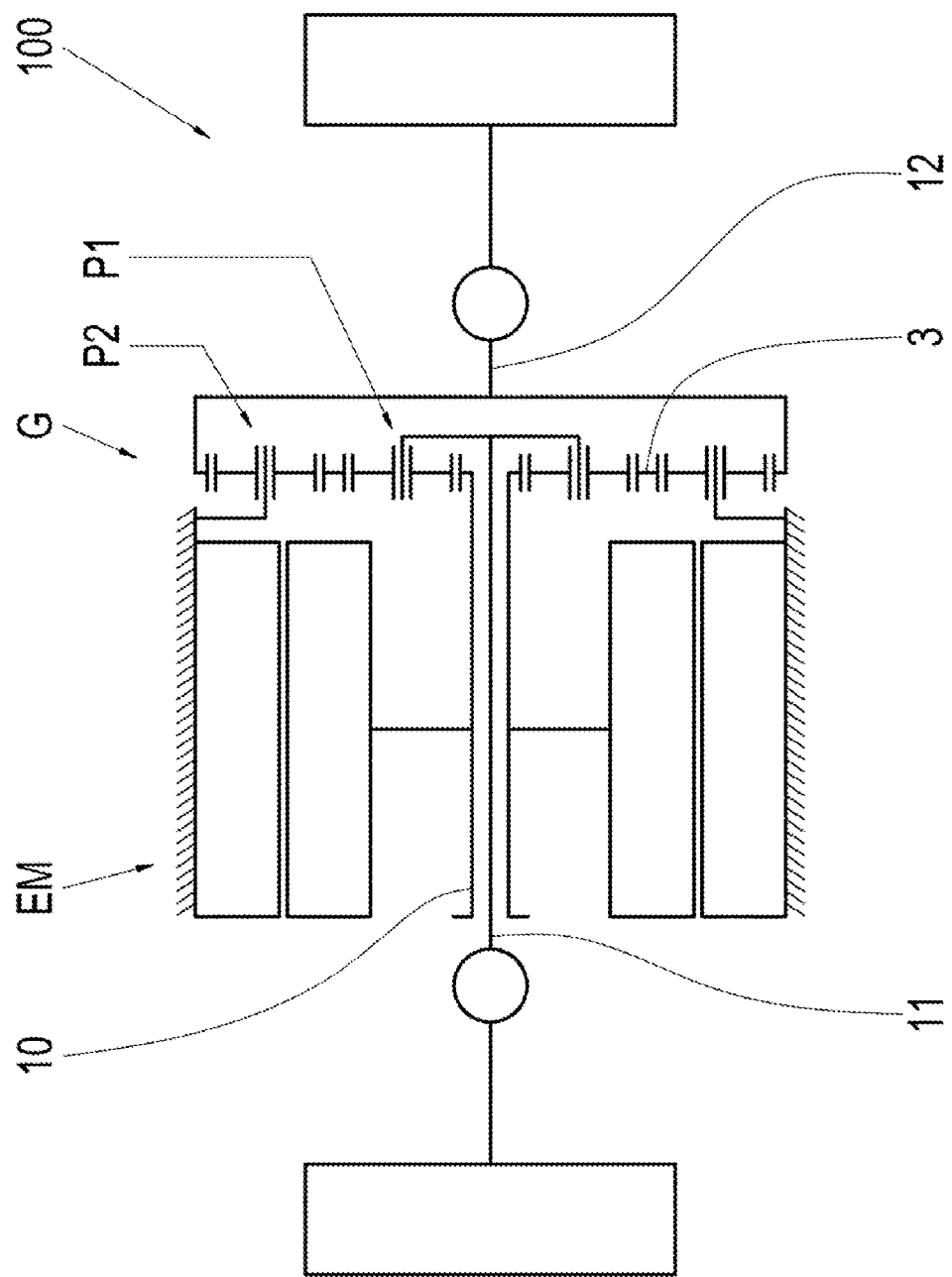

FIG. 11 shows a further powertrain 100 having a transmission G in exemplary arrangement. In contrast with the arrangement shown in FIG. 10, the planetary gear sets P1, P2 are not arranged axially next to one another, but radially over one another, that is to say are nested. The transmission G is thus the exemplary arrangement from FIG. 3. Otherwise, reference is made to the statements according to FIG. 10 and FIG. 3.

Figure 12:
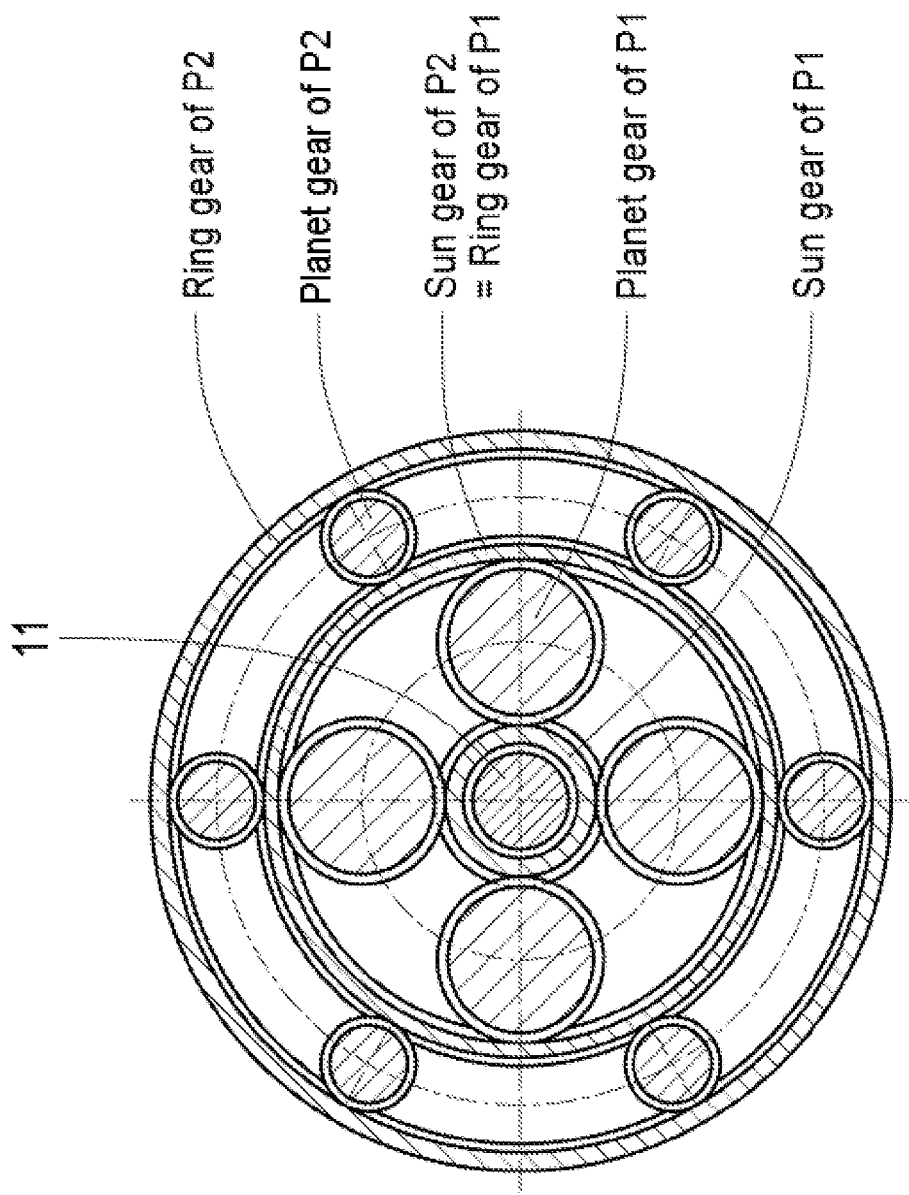
FIG. 12 shows the arrangement according to FIG. 3 in a sectional view.

FIG. 12 shows the exemplary arrangement of the transmission G according to FIG. 3 in a sectional view. The shaft situated in the center is the output shaft 11. In this drawing, the input shaft 10 coincides with the sun gear of P1, that is to say, in other words, the input shaft 10 is connected to a sun gear of the first planetary gear set P1. The sun gear of the first planetary gear set P1 in turn meshes with planet gears of the first planetary gear set P1. The planet dears of the first planetary gear set P1 mesh in turn with the surrounding ring gear of the first planetary gear set P1, wherein the ring gear simultaneously forms the sun gear of the second planetary gear set P2. The sun gear of the second planetary gear set P2 meshes in turn with planet gears of the second planetary gear set P2. The planet gears of the second planetary gear set P2 mesh in turn with the ring gear of the second planetary gear set P2 that surrounds the planet gears.

As can clearly be seen, the number of planets of the second planetary gear set is greater than the number of planets of the first planetary gear set. According to the arrangement, the second planetary gear set has six planets, whereas, on the other hand, the first planetary gear set has four planets.

This exemplary configuration allows for a large transmission ratio to be achieved, which in turn makes possible a particularly compact and cost-effective electric machine.

However, according to the calculating rule $$i_{02} = \frac{1}{i_{01}} - 1$$

a large transmission ratio leads to a stationary transmission ratio, which is small in terms of amount, on the second planetary gear set P2. A small stationary transmission ratio leads in turn to a small planet diameter. A small planet diameter in turn impairs the meshing engagement and reduces the installation space for the planet bearings.

It has been found that a higher planet number of the second planetary gear set by comparison with the first planetary gear set counteracts this effect.

Figure 14:
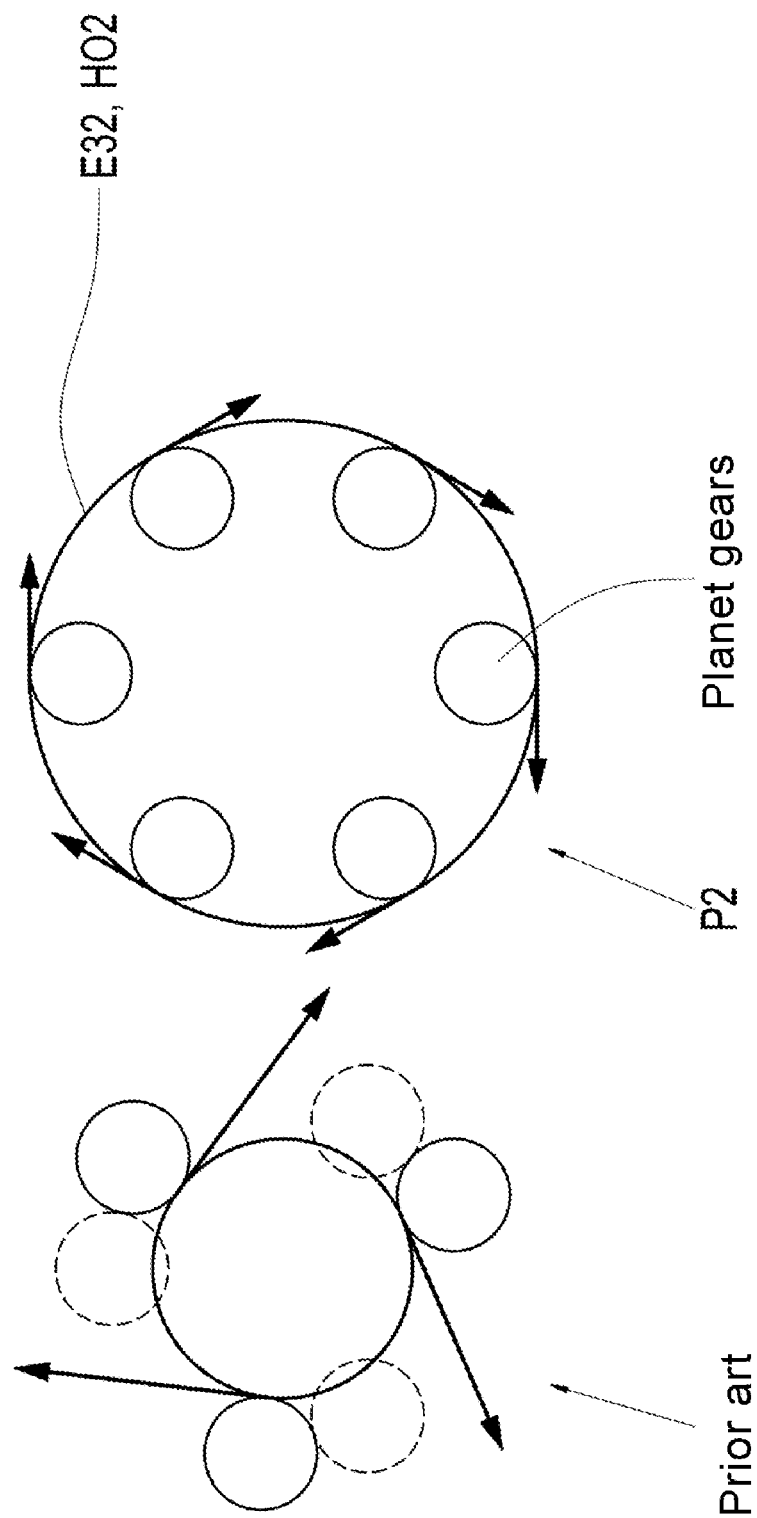

The following FIGS. 13 to 15 show the force introduction and force supporting of the disclosure by comparison with the prior art, such as, for example, DE 10 2011 079 975 A1. Set against the prior art is an exemplary arrangement with two minus planetary gear mechanisms as have been described, inter glia, in FIGS. 2 and 3. However, this consideration also applies, mutatis mutandis, to the remaining arrangement.

For FIGS. 13 to 15, the following applies in general:

On the first planetary gear set P1, the torque of the input shaft 10 is converted into the output torque for the first output 11. The third element E31 of the first planetary gear set P1 (which is simultaneously the first element E12 of the second planetary gear set P2) is driven backward by its reaction torque. The backward movement of the third element E31 is allowed, with the result that part of the mechanical drive power (preferably 50% in the case of the transverse differential and straight-ahead travel) is channeled through the first planetary gear set P1 into the second planetary gear set.

Furthermore, the backward rotation increases the transmission ratio to the first output (11) (stationary transmission ratio i0=−3 would allow only a transmission ratio of i=4 with the ring gear fixed).

In the second planetary gear set P2, the direction of rotation (backward) introduced on the first element (E12) is reversed (forward) with the aid of a housing support (E22) into the drive movement of the second output (12). Here, the torque introduced into the second planetary gear set P2 and the torque channeled out to the second output (12) sum up to give the housing support torque, Here, the second planetary gear set P2 transmits only that part of the mechanical power which is channeled to the second output (12) (typically 50%). Only part of the power acts on the second planetary gear set P2, with the result that the overall efficiency is positively influenced.

In the prior art, a torque conversion usually occurs with the aid of a housing support. Here, the reaction torque of the step-up transmission is channeled directly into the housing and does not serve to generate the second output torque. The result is that it is first necessary to design a transmission for the sum torque of the two output shafts (as a rule double torque). A separate differential transmission is then required in order for this sum torque, which is required nowhere in this form, to be split again into two output torques.

The individual FIGS. 13 to 15 show specifically:

FIG. 13 schematically shows the first planetary gear set P1 of the transmission G (on the right) and a first stage of the spur gear differential from the prior art (on the left). The force introduction from the planet gears to the sun gear occurs in parallel via 3 stationary, i.e. fixed, meshing engagements. The output to the first output shaft occurs via the sun gear.

By contrast thereto, the force introduction according to exemplary arrangement occurs in parallel via eight moving, i.e. rotating, meshing engagements. Four meshing engagements exist between the sun gear SO1 and four planet gears. Four further meshing engagements act between a respective planet gear and the ring gear HO1 (not shown). The output to the first output shaft 11 occurs via the planet gear carrier PT1. The technical effect lies in the considerably smaller tooth forces which act on the first planetary gear set.

FIG. 14 schematically shows the second planetary gear set P2 of the transmission G (on the right) and a second stage of the stepped planets from the prior art (on the left). The force introduction from the planet gears to the sun gear occurs in parallel via 3 stationary, i.e. fixed, meshing engagements. The output to the second output shaft occurs via the sun gear.

In contrast thereto, the force introduction into the second planetary gear set P2 according to the exemplary arrangement occurs in parallel via 6 moving, i.e. rotating, meshing engagements. The six meshing engagements act in each case between one of the six planet gears and the ring gear HO2. The fixed planet carrier PT2, which carries the six planet gears, and the sun gear SO2 are not illustrated. The output to the second output shaft 12 occurs via the ring gear HO2. The technical effect lies in the considerably smaller tooth forces which act on the second planetary gear set on account of the larger effective diameter and on account of the larger possible planet number.

FIG. 15 schematically shows the introduction of the supporting torque into the housing. In the case of the stepped planet according to the prior art (on the left), the force introduction occurs into a fixed ring gear via 3 parallel meshing engagements.

According to the exemplary arrangements, the force introduction occurs into the fixed planet carrier PT2 via 12 parallel meshing engagements. Six meshing engagements act between the sun gear SO2 and the six planet gears of the second planetary gear set. The six other meshing engagements act between each planet gear of the second planetary gear set and the ring gear HO2. The technical effect lies in the considerably smaller tooth forces which act on the second planet carrier PT2.

Figure 16:
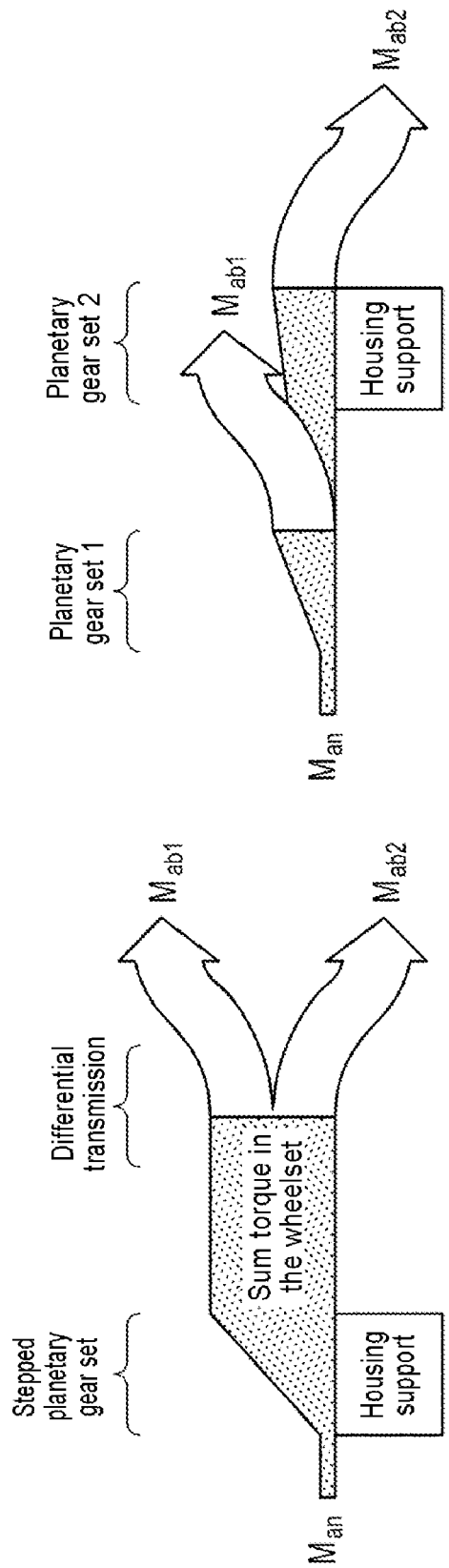

FIG. 16 shows the principle (which is illustrated in further detail in FIGS. 13 to 15) in a further view.

The largest torque in the gear set according to the disclosure (on the right) corresponds to the output torque of a single gear. Following physical laws, only the housing support has a high torque factor.

The stepped planetary gear set according to the prior art (on the left) generates the full output torque, that is to say the sum torque of both gears, from an input torque Man. The differential divides this high torque into two half gear torques $M_{an1}$ and $M_{an2}$.

The drawing symbolically illustrates the torques in terms of amount on their path through the transmission. Directions of rotations do not emerge therefrom.

FIG. 17 gives an overview of the calculating rule of the stationary transmission ratio of the individual exemplary arrangements. They produce in each case, with transmission losses being disregarded, an output torque of the same level and with the same sign on both output shafts (11, 12). $i_{o1}$ designates the stationary transmission ratio of the first planetary gear set P1. $i_{o2}$ designates the stationary transmission ratio of the second planetary gear set P2. Depending on the use of the transmission, one of the planetary gear set configurations can be chosen with a corresponding stationary transmission ratio.

The following figures describe the implementation of a 2-speed transmission in the form of a third planetary gear set P3 into the transmission shown above.

Here, FIGS. 18 to 29 show different configurations of the two-speed transmission with regard to the design of the third planetary gear set P3 as a minus or as a plus gear set. Also illustrated in each case are the various blocking variants. Depending on the transmission, 12 modifications are accordingly possible, concerning the planetary gear set or the blocking variant.

Figure 18:
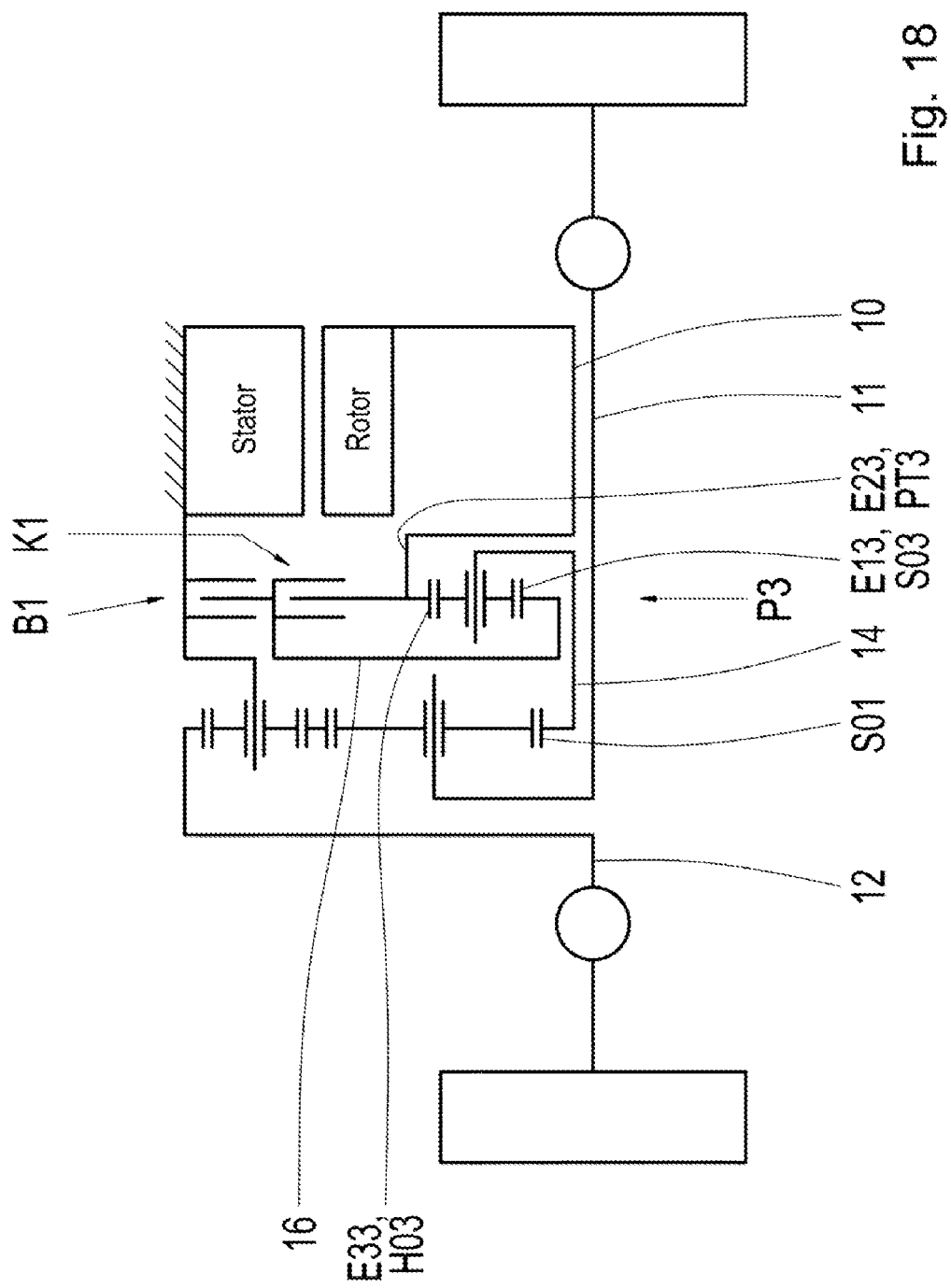

FIG. 18 shows the exemplary arrangement of the transmission according to FIG. 3 or the powertrain according to FIG. 11 with a third planetary gear set and two shift elements for realizing a step up of the input shaft. Proceeding from the description pertaining to FIGS. 3 and 11, to which reference is expressly made, a third planet gear P3 and two shift elements are provided to step up the drive rotational speed of the electric machine EM.

The third planetary gear set P3 is designed as a minus planetary gear set and has three elements, namely a first element E13, a second element E23 and a third element E33. The first element E13 is present as a sun gear SO3, the second element is present as a planet carrier PT3 and the third element E33 is present as a ring gear HO3.

The third element E33, that to say in the present case the ring gear HO3, of the third planetary gear set P3 is connected to the input shaft 10. The second element E23, that is to say in the present case the planet carrier PT3, is always connected to the first element E11, in the present case the sun gear SO1, of the firs planetary gear set P1 via an intermediate shaft 14. The rotor R of the electric machine EM is connected to the input shaft 10.

It should be pointed out at this juncture that the input shaft 10 of the arrangements according to FIGS. 1 to 11 and the input shaft 10 of the exemplary arrangement according to FIG. 18 are identical, What they have in common is that they are connected to the drive machine. Only the third planetary gear set P3 is now arranged between the input shaft 10 and the first element E11 of the first planetary gear set P1, with the result therefore that, by contrast, it is not the sun gear SO1 but the ring gear HO3 which can be driven, The third planetary gear set P3 can be blocked by connecting the sun gear SO3 to the ring gear HO3. For this purpose there is provided a first shift element which, in the actuated state, connects the sun gear SO3 to the ring gear HO3. A second shift element, in the actuated state, can connect the sun gear SO3 to the housing GG, as a result of which the sun gear SO3 is fixed. The first shift element is designed as a clutch K1, whereas, by contrast, the second element is configured as a brake B1.

The output shaft 11 is guided through the hollow-shaped input shaft 10, the hollow-shaped sun gear SO3 and through the rotor R, with the result that an extremely compact transmission is provided.

As can also be seen, the clutch K1 and brake B1 are arranged so as to lie radially over one another, wherein, in the present case, the brake B1 is arranged radially outside the clutch K1. Both shift elements K1, B1 are arranged radially outside the third planetary gear set P3. The third planetary gear set and the two shift elements are placed axially between the first and second planetary gear set on the one hand and the electric machine on the other hand, A connecting element 16 connects the sun gear SO3 to the clutch K1. The latter is partially arranged axially between the first and third planetary gear set.

The first speed of the 2-speed transmission is realized by closing, that is to say actuating, the brake B1. In the first speed, the clutch is open, that is to say not actuated. The second speed of the 2-speed transmission is realized by actuating the clutch K1. In the second speed, the brake is open, that is to say not actuated.

Figure 19:
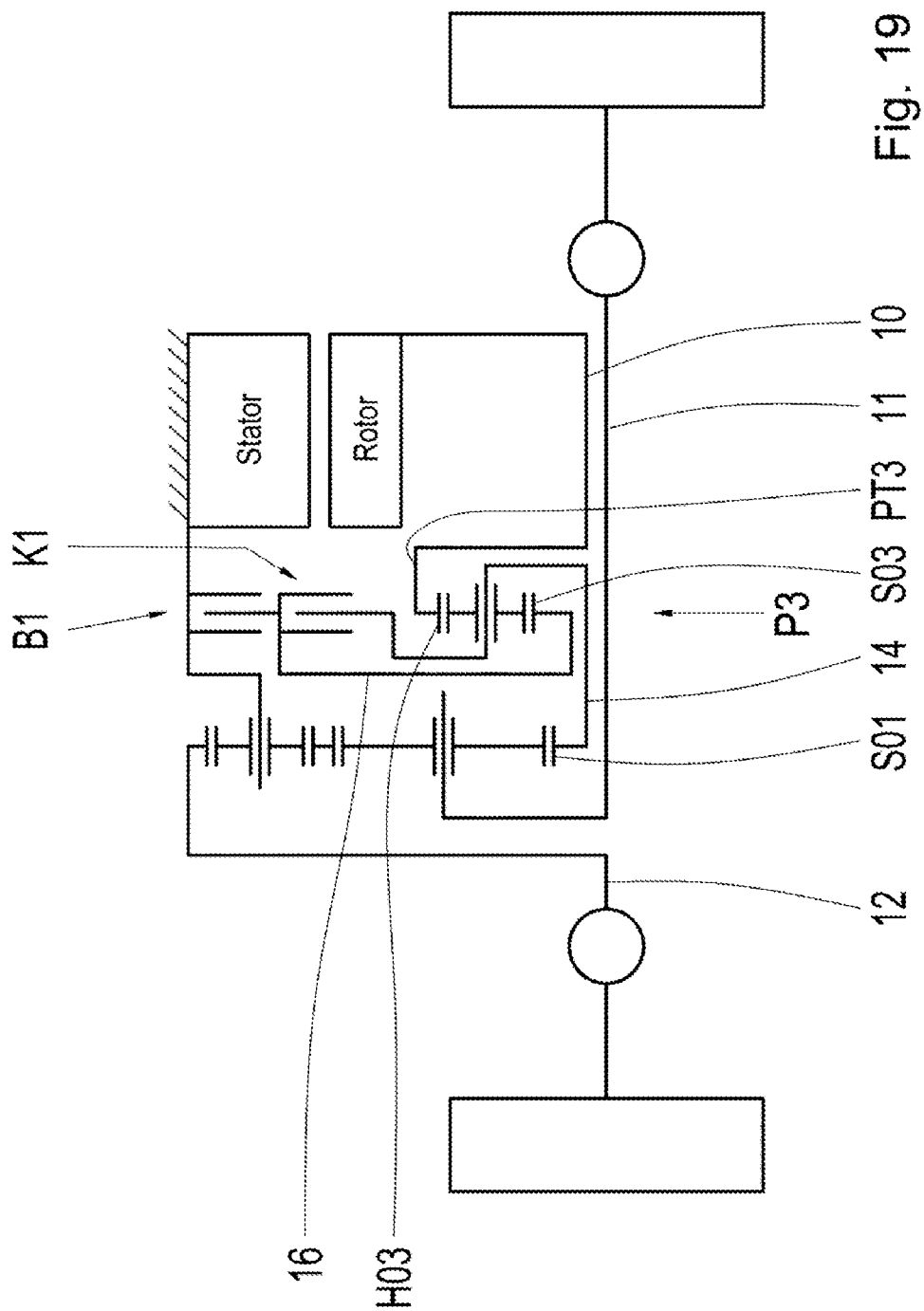

FIG. 19 shows a modification of the shown in FIG. 18. By contrast, the blocking of the third planetary gear set P3 occurs by connecting the sun gear SO3 to the planet carrier PT3, resulting in one blocking variant. Otherwise, this arrangement corresponds to the arrangement according to FIG. 18.

Figure 20:
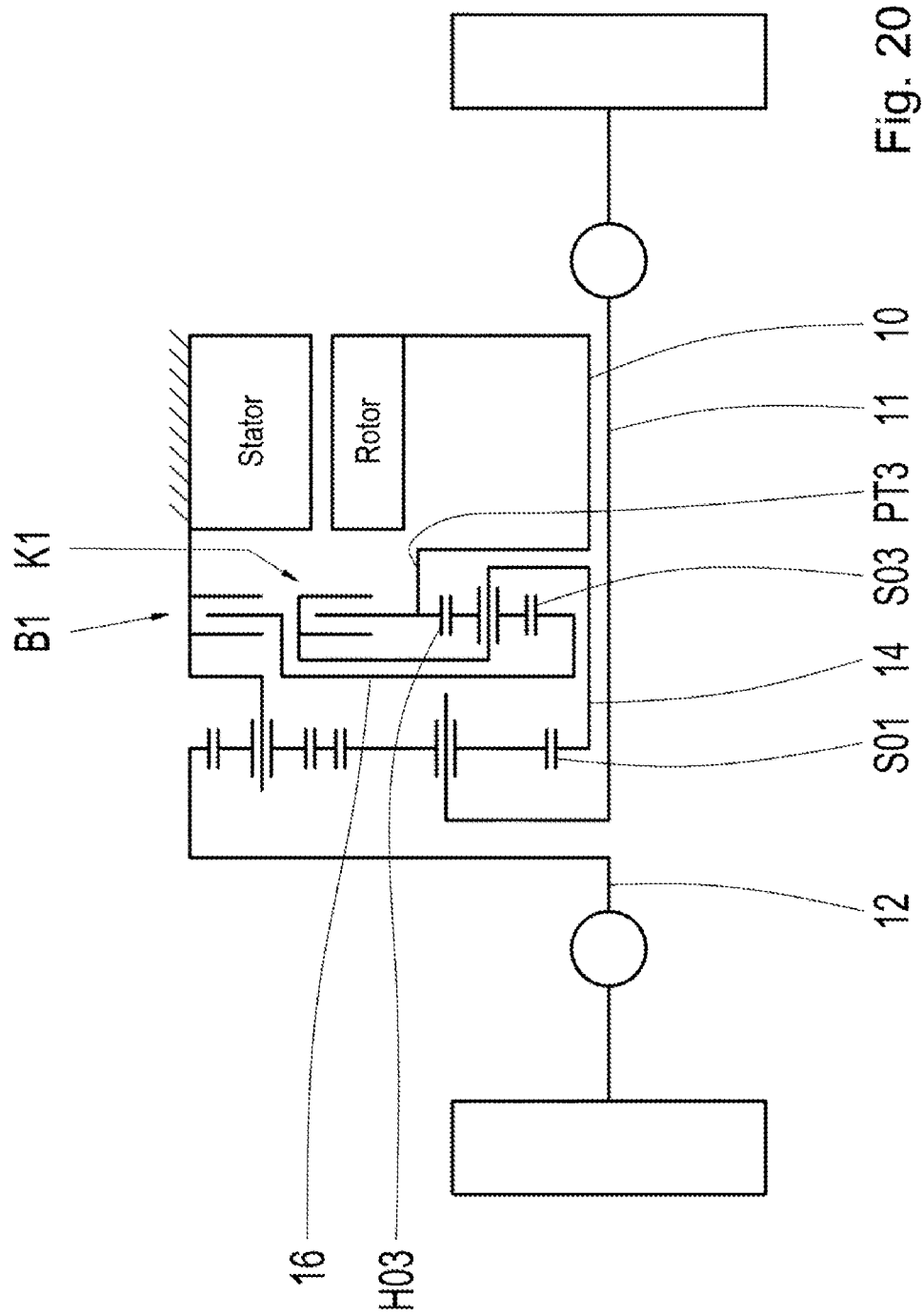

FIG. 20 shows a modification of the arrangement according to FIG. 18. By contrast, the blocking of the third planetary gear set P3 occurs by connecting the ring gear HO3 to the planet carrier PT3, resulting in one blocking variant. Otherwise, this exemplary arrangement corresponds to the arrangement according to FIG. 18.

Figure 21:
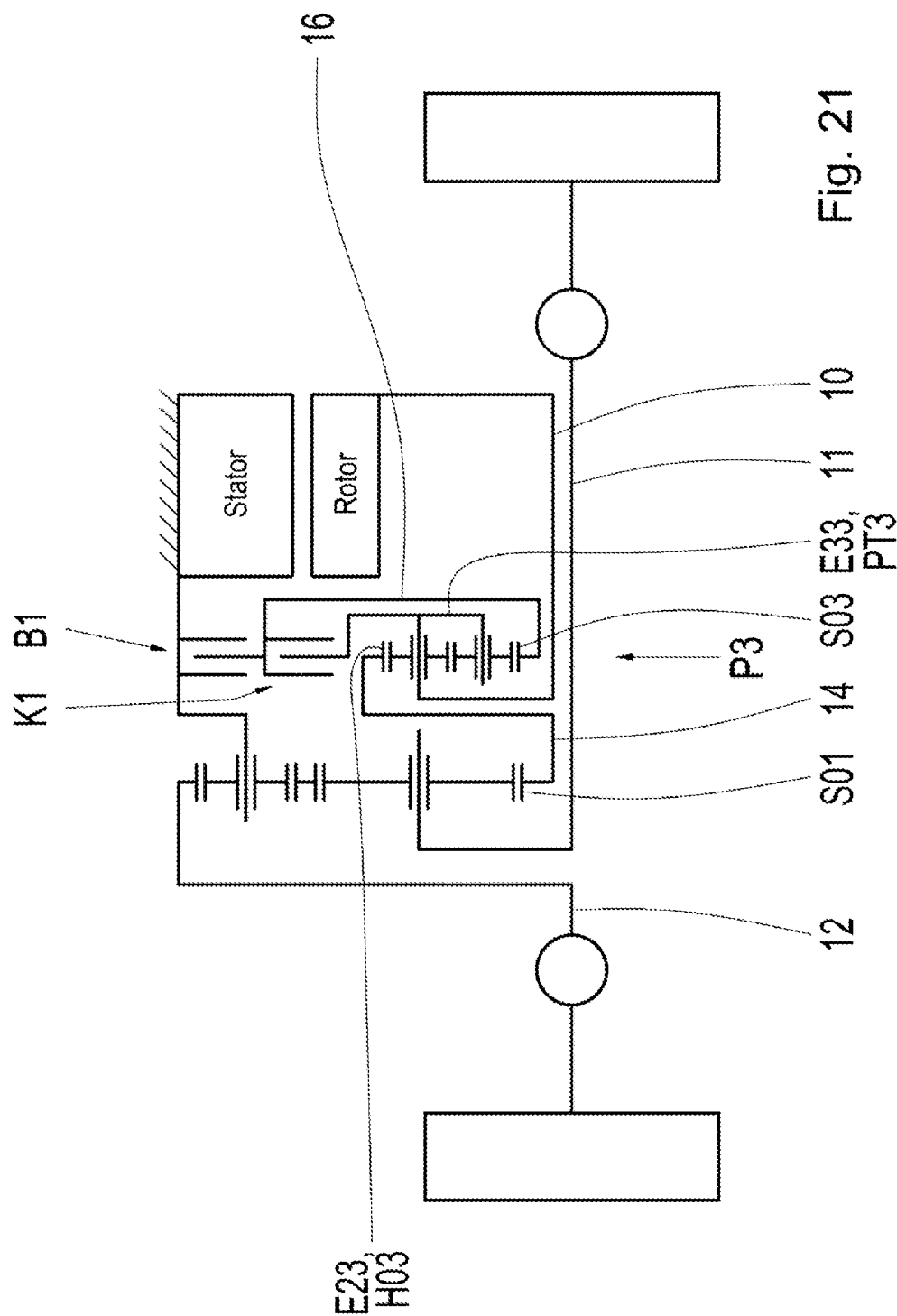

FIG. 21 shows a further exemplary arrangement of the disclosure. Kinematically, the arrangement of FIG. 21 corresponds to that arrangement according to FIG. 18. By contrast thereto, the third planetary gear set P3 is configured as a plus planetary gear set. Moreover, the connecting element 16 is partially arranged axially between the third planetary gear set P3 and electric machine.

The input shaft 10 is still connected to the second element E23, wherein the element E23 is now a ring gear HO3. The rotor R is still connected to the third element E33 of the third planetary gear set P3, wherein the third element E33 is now a planet carrier PT3.

The brake B1 can fix the sun gear SO3 on the housing GG. The clutch K1 can block the third planetary gear set P3 by the connection of sun gear SO3 and planet carrier PT3. Otherwise, this arrangement corresponds to the arrangement according to FIG. 18.

Figure 22:
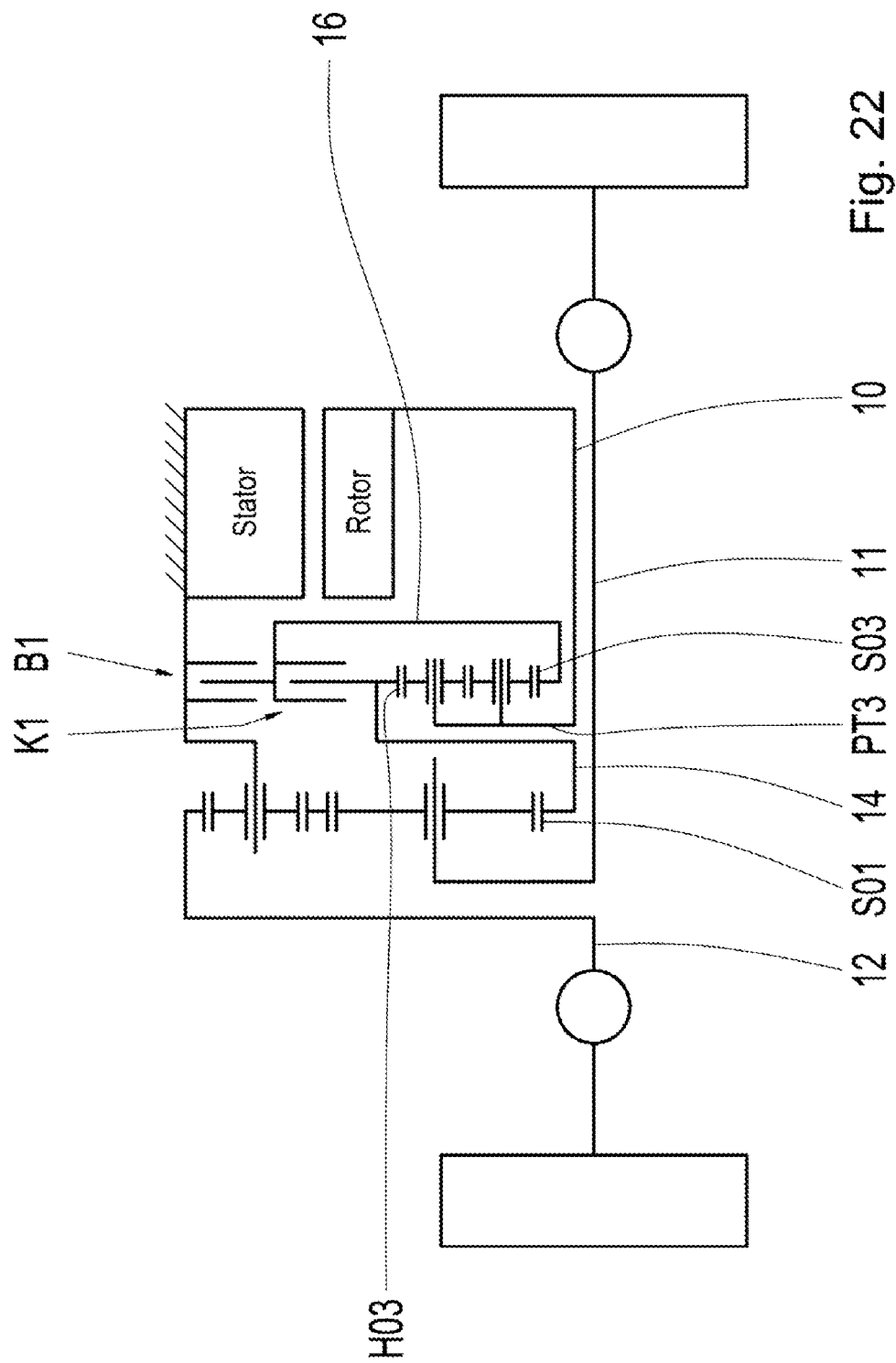

FIG. 22 shows a modification of the arrangement according to FIG. 21. By contrast, the blocking of the third planetary gear set P3 occurs by connecting the ring gear HO3 to the sun gear. Otherwise, this arrangement corresponds to the arrangement according to FIG. 21.

Figure 23:
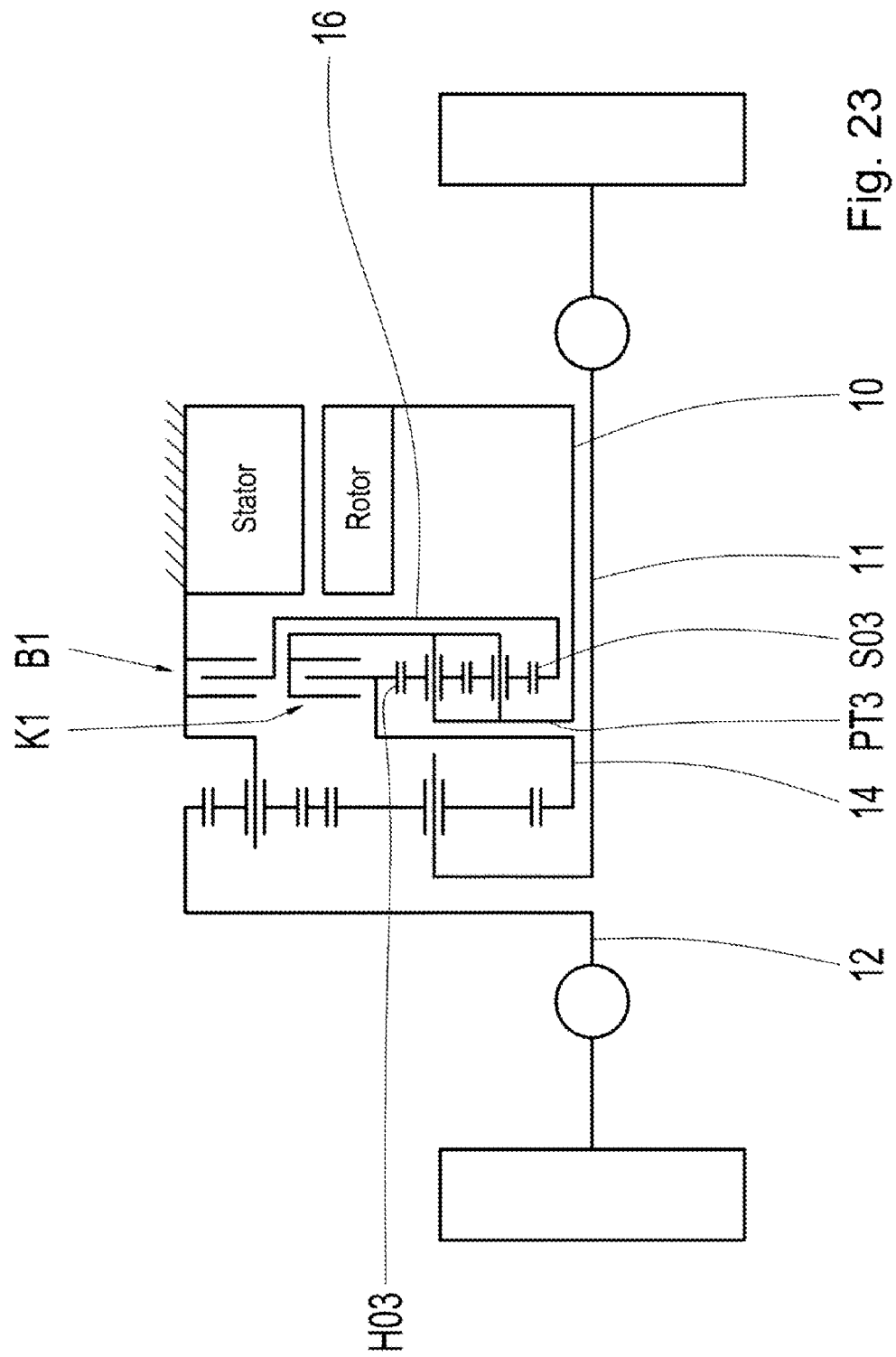

FIG. 23 shows a modification of the arrangement according to FIG. 21. By contrast, the blocking of the third planetary gear set P3 occurs by connecting the planet carrier PT3 to the sun gear SO3. Otherwise, this arrangement corresponds to the arrangement according to FIG. 21.

Figure 24:
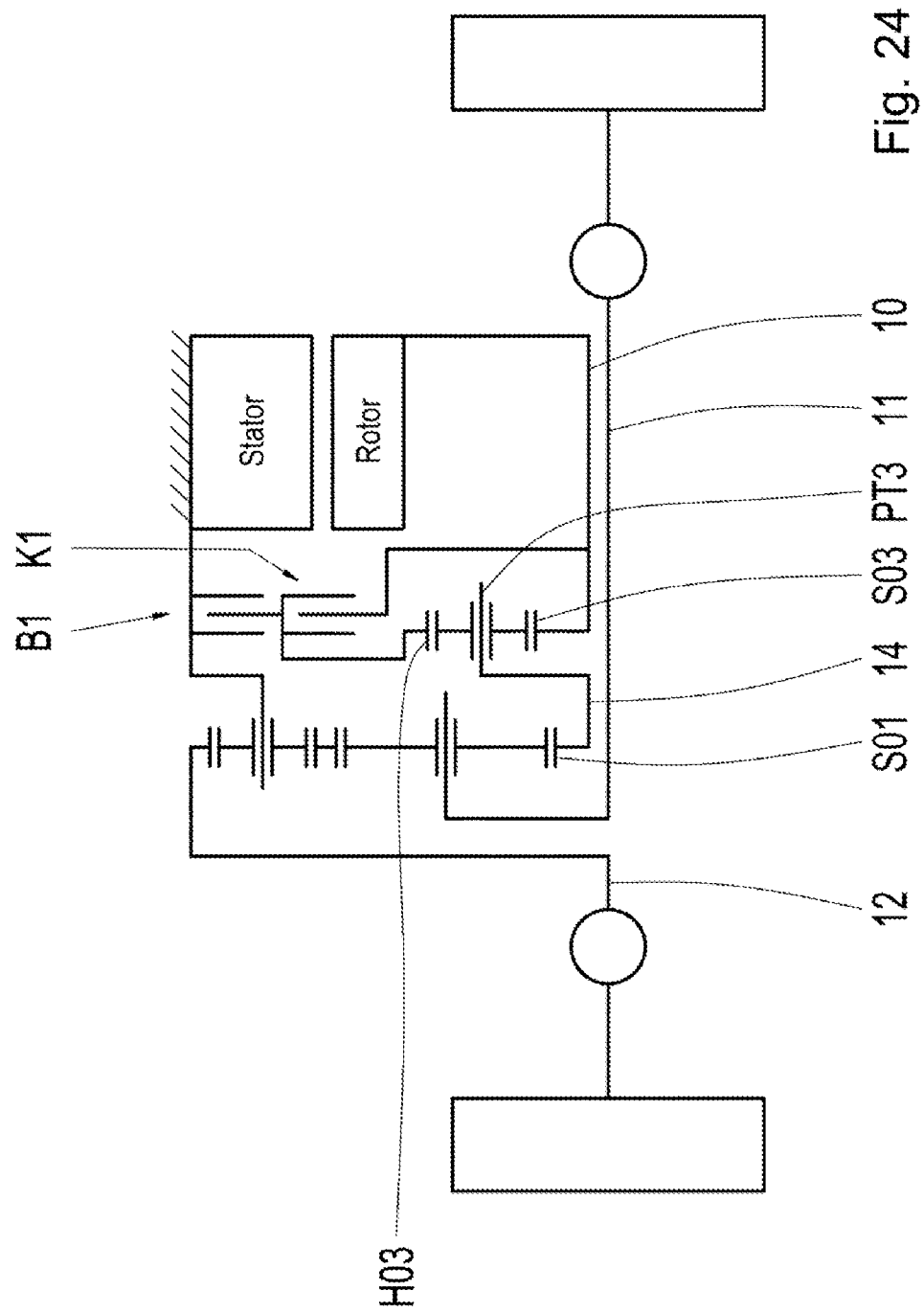

FIG. 24 shows a further arrangement of the disclosure. By contrast to the embodiment according to FIG. 18, the rotor is not connected to the ring gear HO3 but to the first element E13, that is to say in the present arrangement to the sun gear S03. Furthermore, the planet carrier PT3 is connected to the sun gear SO1. By actuating the brake B1, the ring gear HO3 can be fixed on the housing GG. By actuating the dutch K1, the sun gear SO3 and ring gear HO3 are connected, as a result of which the third planetary gear set P3 is blocked. Otherwise, this exemplary arrangement corresponds to the arrangement according to FIG. 18.

Figure 25:
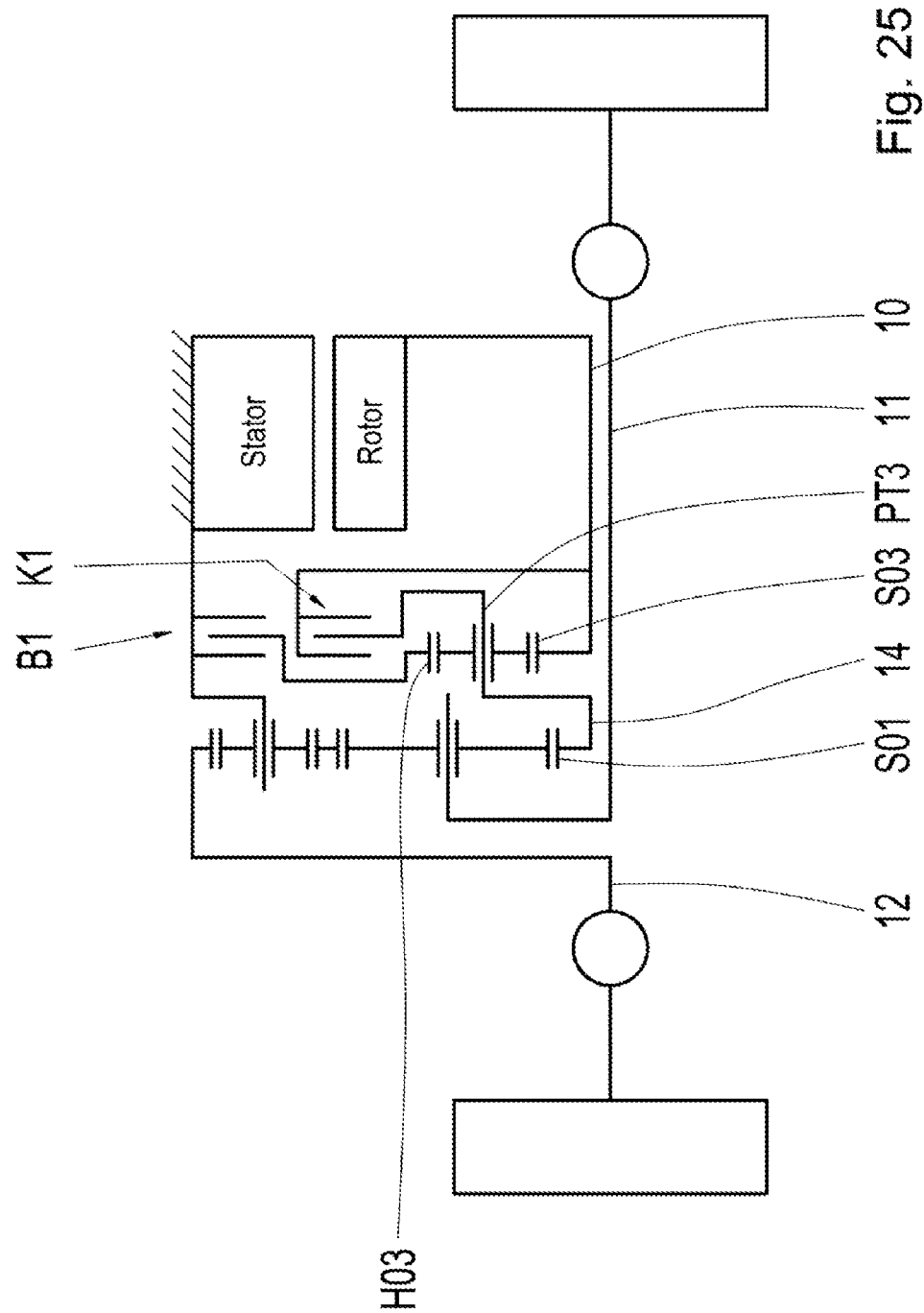

FIG. 25 shows a modification of the exemplary arrangement according to FIG. 24. By contrast, the blocking of the third planetary gear set P3 occurs by connecting the sun gear SO3 to the planet carrier PT3, resulting in one blocking variant. Otherwise, this arrangement corresponds to the arrangement according to FIG. 24.

Figure 26:
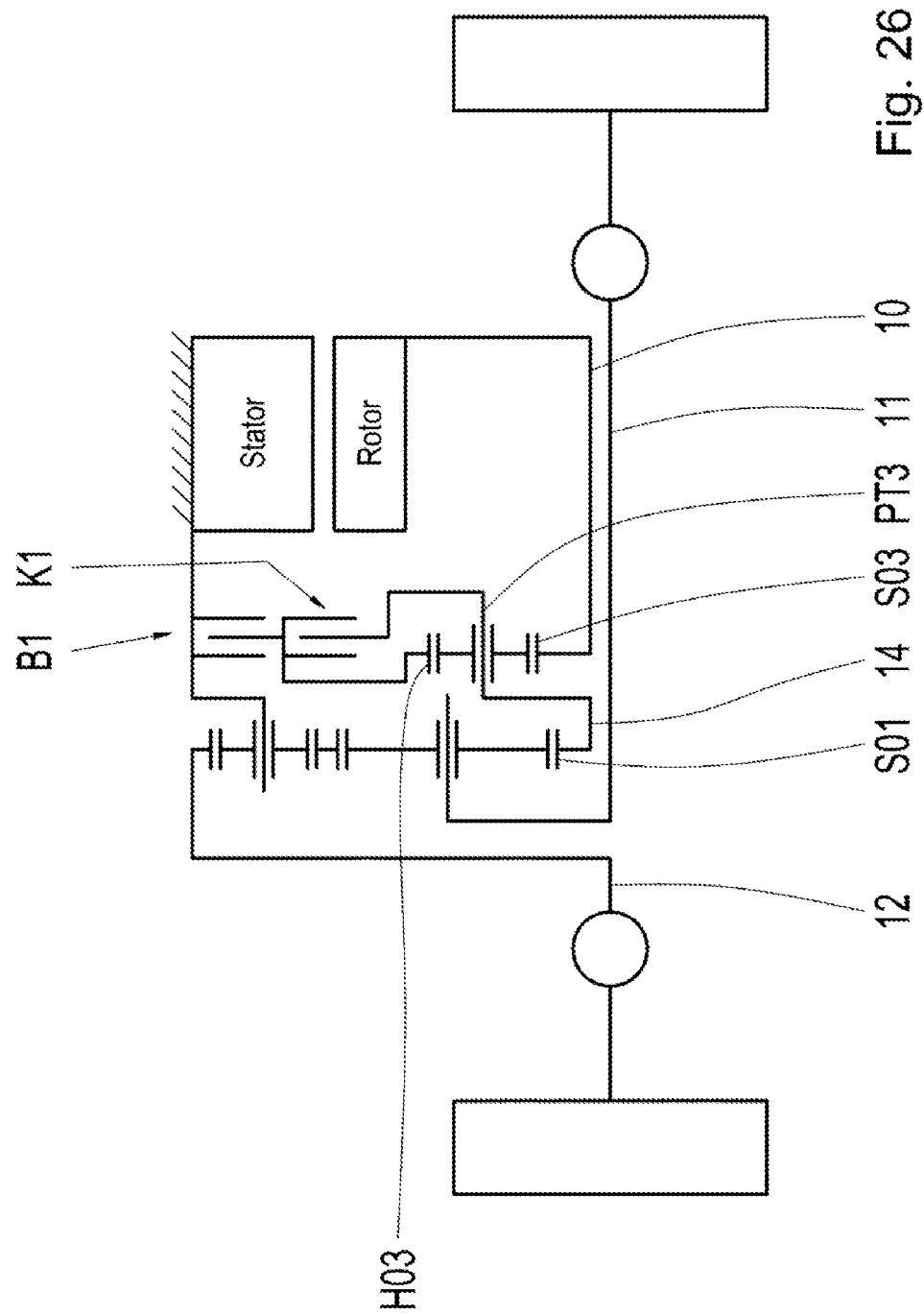

FIG. 26 shows a modification of the exemplary arrangement according to FIG. 24. By contrast, the blocking of the third planetary gear set P3 occurs by connecting the ring gear HO3 to the planet carrier PT3, resulting in one blocking variant. Otherwise, this arrangement corresponds to the arrangement according to FIG. 24.

Figure 27:
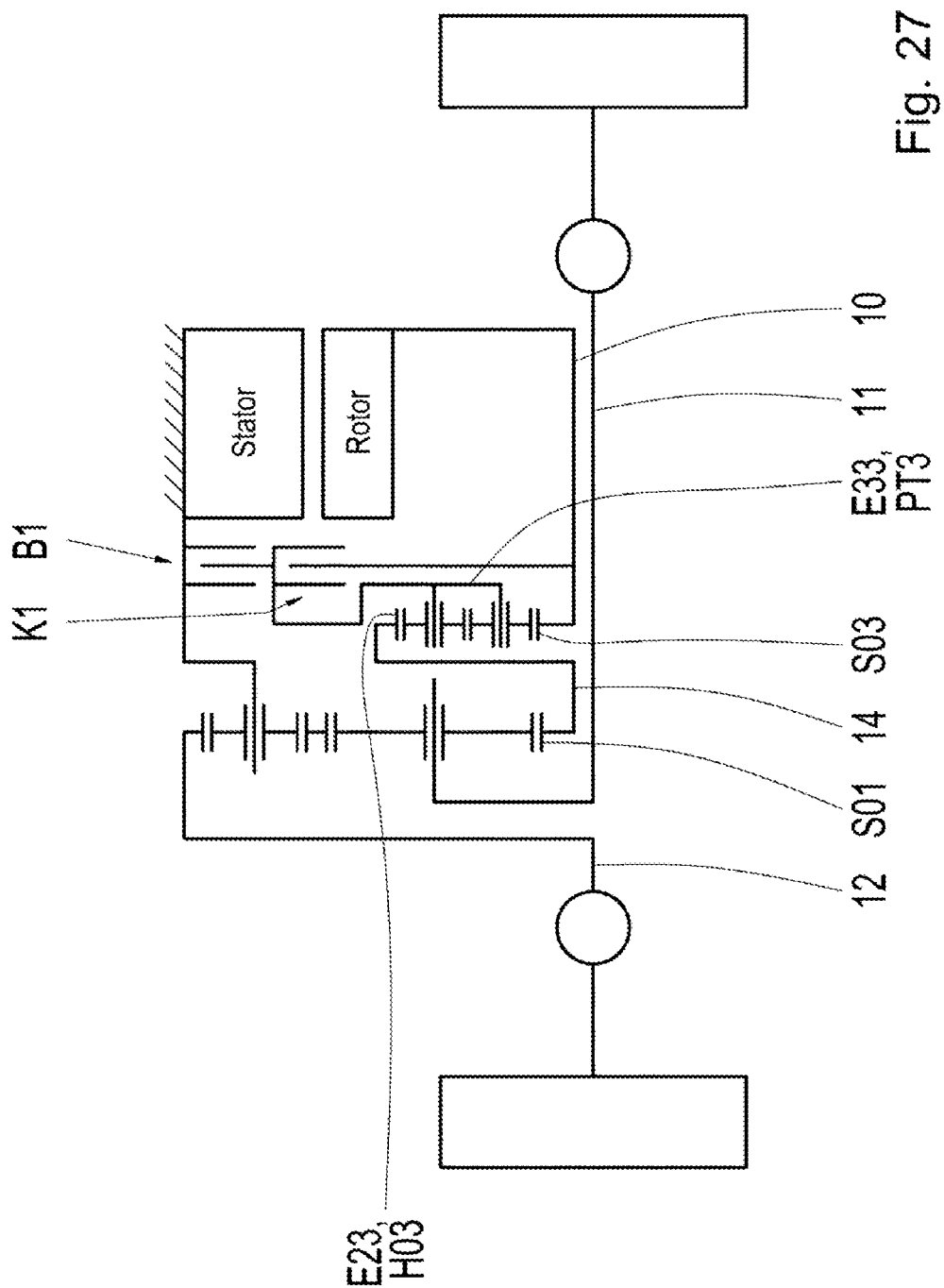

FIG. 27 shows a further exemplary arrangement of the disclosure, in contrast with the arrangement according to FIG. 24, the third planetary gear set P3 is configured as a plus planetary gear set.

The input shaft 10 is accordingly still connected to the second element E23, wherein the second element E23 is, in the present arrangement, a ring gear.

The rotor is still connected to the sun gear SO3.

The brake B1 can fix the third element E33, in the present arrangement the planet carrier PT3, on the housing GG. The clutch K1 can block the third planetary gear set P3 by connecting the first element, that is to say the sun dear SO3, and the third element E33, that is to say the planet carrier PT3. Otherwise, this exemplary arrangement corresponds to the arrangement according to FIG. 24.

FIG. 28 shows a modification of the arrangement according to FIG. 27. In contrast, the blocking of the third planetary gear set P3 occurs by connecting the sun gear SO3 to the ring gear HO3, resulting in one blocking variant. Otherwise, this exemplary arrangement corresponds to the arrangement according to FIG. 27.

FIG. 29 shows a modification of the exemplary arrangement according to FIG. 27. In contrast, the blocking of the third planetary gear set P3 occurs by connecting the ring gear HO3 to the planet carrier PT3, resulting in one blocking variant. Otherwise, this exemplary arrangement corresponds to the arrangement according to FIG. 27.

It should once again be pointed out at this juncture that the third planetary gear set and the 2 shift elements can be combined with all of the transmissions as are disclosed in FIGS. 2 and 4 to 9:

In the case of the transmission according to FIG. 2, the connection of the 2-speed transmission occurs identically to that in the case of the transmission according to FIG. 3, since the only difference concerns the arrangement of the first and second planetary gear set. The axially spaced arrangement of the first planetary gear set with respect to the second planetary gear set does not have an effect on the connection of the third planetary gear set and on the two shift elements.

In the case of the transmission according to FIG. 4, the connection of the 2-speed transmission occurs identically to that in the case of the transmission according to FIG. 3, since the only difference relates to the conversion of the first planetary gear set into a plus planetary gear set. Here, only planet carrier and ring gear connections are interchanged, which has no effects on the connection of the third planetary gear set. This is because the connection of the third planetary gear set occurs specifically via the input shaft 10 with the sun gear SO1. The axially spaced arrangement of the first planetary gear set with respect to the second planetary gear set does not have an effect on the connection of the third planetary gear set and on the two shift elements.

In the case of the transmission according to FIG. 5, the connection of the 2-speed transmission occurs identically to that in the case of the transmission according to FIG. 3, since the only difference concerns the conversion of the first planetary gear set and of the second planetary gear set into a plus planetary gear set. Here, only the planet carrier and ring gear connections are interchanged, which has no effects on the connection of the third planetary gear set. This is because the connection of the third planetary gear set occurs specifically via the input shaft 10 with the sun gear SO1. The axially spaced arrangement of the first planetary gear set with respect to the second planetary gear set does not have an effect on the connection of the third planetary gear set and on the two shift elements.

In the case of the transmission according to FIG. 6, the connection of the 2-speed transmission occurs identically to that in the case of the transmission according to FIG. 3, since the only difference concerns the conversion of the second planetary gear set into a plus planetary gear set. Here, only the planet carrier and ring gear connections are interchanged, which has no effects on the connection of the third planetary gear set. This is because the connection of the third planetary gear set occurs specifically via the input shaft 10 with the sun gear SO1. The axially spaced arrangement of the first planetary gear set with respect to the second planetary gear set does not have an effect on the connection of the third planetary gear set and on the two shift elements.

In the case of the transmission according to FIG. 7, the connection of 2-speed transmission occurs identically to that in the case of the transmission according to FIG. 3, since the only difference concerns the conversion of the second planetary gear set into a plus planetary gear set. Here, only the planet carrier and ring gear connections are interchanged, which has no effects on the connection of the third planetary gear set. This is because the connection of the third planetary gear set occurs specifically via the input shaft 10 with the sun gear SO1.

FIGS. 2 to 7 correspond to the first concept. All modifications with respect to the conversion of the third planetary gear set into a plus planetary gear set or blocking variants are possible in these transmissions, as shown by way of example in FIGS. 18 to 29 by way of the transmission from FIG. 3.

The transmission according to FIG. 8 corresponds to the second concept. In the case of the transmission according to FIG. 8, the connection of the 2-speed transmission occurs identically to that in the case of the transmission according to FIG. 3. Although, as a departure from FIG. 3, the first output shaft 11 is connected to the ring gear HO1 and the planet carrier PT1 is connected to the ring gear HO2, this change concerns only the connection of the first and second planetary gear set P1, P2 to one another or their connection to the housing. Not affected thereby is the input shaft 10, which continues to connect the rotor R to the sun gear SO1. The axially spaced arrangement of the first planetary gear set with respect to the second planetary gear set does not have an effect on the connection of the third planetary gear set and on the two shift elements.

The transmission according to FIG. 9 corresponds to the third concept. In the case of the transmission according to FIG. 9, the connection of the 2-speed transmission occurs with a modification. According to FIG. 9, the drive occurs via the ring gear HO1. For the purposes of connecting, the third element E33 (the ring gear HO3 in a minus planetary gear set) of the third planetary gear set P3 can be connected to the rotor. The second element E23 (the planet carrier PT3 in a minus planetary gear set) of the third planetary gear set P3 can be connected to the input shaft 10, which in turn is connected to the ring gear HO1 of the first planetary gear set P1 in a rotationally fixed manner. The sun gear SO3 can be connected to the planet carrier PT3 by the clutch K1 and in this way the third planetary gear set P3 can be blocked. The sun gear can be fixed by the brake B1.

The disclosure has been comprehensively described and explained on the basis of the drawings and the description. The description and explanation are to be understood as an example and not as limiting. The disclosure is not restricted to the disclosed arrangements. Other arrangements or variations will result for a person skilled in the art when using the present disclosure and when precisely analyzing the drawings, the disclosure and the following patent claims.

In the patent claims, the words "comprise" and "having" do not exclude the presence of further elements or steps. The indefinite article "a" or "an" does not exclude the presence of a plurality. An individual element or an individual unit can carry out the functions of a plurality of the units stated in the patent claims. The mere citing of some measures in a plurality of different dependent patent claims is not to be understood to the effect that a combination of these measures cannot also be used advantageously.

The invention claimed is:

1. A transmission, comprising an input shaft, a first output shaft, a second output shaft, a first planetary gear set and a second planetary gear set connected to the first planetary gear set, wherein the first and second planetary gear sets-each comprise a plurality of elements, wherein
   the first output shaft is connected to a second element of the first planetary gear set in a rotationally fixed manner,
   the second output shaft is connected to a third element of the second planetary gear set-in a rotationally fixed manner,
   a third element of the first planetary gear set is connected to a first element of the second planetary gear set via a shaft, and
   a second element of the second planetary gear set is fixed on a rotationally fixed component,
   the transmission further comprising a third planetary gear set comprising three elements and two shift elements, wherein a first shift element is designed to block the third planetary gear set by rotationally fixed connection of two of its elements, a second shift element is designed to fix a first element of the third planetary gear set on the rotationally fixed component, a second element of the third planetary gear set is connected to a first element of the first planetary gear set in a rotationally fixed manner via an intermediate shaft, a third element of the third planetary gear set is connected to the input shaft in a rotationally fixed manner; and wherein the third planetary gear set is a minus planetary gear set, wherein the first element of the third planetary gear set is a sun gear, the second element of the third planetary gear set is a planet carrier, and the third element of the third planetary gear set is a ring gear.

2. The transmission as claimed in claim 1, wherein the first shift element is a clutch.

3. The transmission as claimed in claim 1, wherein the second shift element is a brake.

4. The transmission as claimed in claim 1, wherein the first shift element is designed to connect the first element to the third element of the third planetary gear set.

5. The transmission as claimed in claim 1, wherein the first shift element is designed to connect the first element to the second element of the third planetary gear set.

6. The transmission as claimed in claim 1, wherein the first shift element is designed to connect the second element to the third element of the third planetary gear set.

7. The transmission as claimed in claim 1, wherein at least one of the shift elements is configured as a power shift element.

8. The transmission as claimed in claim 1, wherein at least one of the shift elements is configured as a positively locking element.

9. The transmission as claimed in claim 1, wherein one of the two shift elements is configured as a power shift element and the other of the two shift elements is configured as a positively locking element.

10. The transmission as claimed in claim 1, wherein the two shift elements are configured as a double shift element.

11. The transmission as claimed in claim 1, wherein the first output shaft is guided through the third planetary gear set.

12. The transmission as claimed in claim 1, wherein the shift elements are arranged radially over one another.

13. The transmission as claimed in claim 1, wherein the number of planets of the second planetary gear set is greater than the number of planets of the first planetary gear set.

14. The transmission as claimed in claim 1, wherein toothings of the two interconnected elements of the first and second planetary gear set are formed on the same component.

15. The transmission as claimed in claim 1, wherein a pitch of the toothing on the third element of the first planetary gear set and on the first element- of the second planetary gear set is identical.

16. The transmission as claimed in claim 1, wherein a stationary transmission ratio of the second planetary gear set is calculated at least approximately from a reciprocal of the stationary transmission ratio of the first planetary gear set minus 1, i.e. $i_{02}=1/i_{01}-1$.

17. The transmission as claimed in claim 16, wherein an amount of the stationary ratio of the third planetary gear set is less than the amount of the stationary ratio of the first planetary gear set.

18. The transmission as claimed in claim 1, wherein the intermediate shaft is guided through the first element of the third planetary gear set.

19. The transmission as claimed in claim 1, wherein the intermediate shaft is at least partially guided radially between the third planetary gear set-and the first output shaft.

20. The transmission as claimed in claim 1, wherein a connecting element connecting the first element of the third planetary gear set and the second shift element is at least partially arranged axially between the first planetary gear set and the third planetary gear set.

21. The transmission as claimed in claim 1, wherein the toothing diameter of the first element of the third planetary gear set is greater than the toothing diameter of the first element of the first planetary gear set.

22. A transmission, comprising an input shaft, a first output shaft, a second output shaft, a first planetary gear set and a second planetary gear set connected to the first planetary gear set, wherein the first and second planetary gear sets—each comprise a plurality of elements, wherein the first output shaft is connected to a second element of the first planetary gear set in a rotationally fixed manner, the second output shaft is connected to a third element of the second planetary gear set-in a rotationally fixed manner, a third element of the first planetary gear set is connected to a first element of the second planetary gear set via a shaft, and a second element of the second planetary gear set is fixed on a rotationally fixed component, the transmission further comprising a third planetary gear set comprising three elements and two shift elements, wherein a first shift element is designed to block the third planetary gear set by rotationally fixed connection of two of its elements, a second shift element is designed to fix a first element of the third planetary gear set on the rotationally fixed component, a second element of the third planetary gear set is connected to a first element of the first planetary gear set in a rotationally fixed manner via an intermediate shaft, a third element of the third planetary gear set is connected to the input shaft in a rotationally fixed manner; and wherein the third planetary gear set is a minus planetary gear set, wherein the first element of the third planetary gear set is a ring gear, the second element of the third planetary gear set is a planet carrier, and the third element of the third planetary gear set is a sun gear.

* * * * *